US011571939B2

(12) United States Patent
Berardi

(10) Patent No.: US 11,571,939 B2
(45) Date of Patent: Feb. 7, 2023

(54) SUSPENSION SYSTEM

(71) Applicant: XTravel Suspension, LLC, Rancho Santa Fe, CA (US)

(72) Inventor: Nestor Alexander Berardi, Temecula, CA (US)

(73) Assignee: XTravel Suspension, LLC, Rancho Santa Fe, CA (US)

( * ) Notice: Subject to any disclaimer, the term of this patent is extended or adjusted under 35 U.S.C. 154(b) by 13 days.

(21) Appl. No.: 17/499,778

(22) Filed: Oct. 12, 2021

(65) Prior Publication Data

US 2022/0111692 A1  Apr. 14, 2022

Related U.S. Application Data

(63) Continuation-in-part of application No. 17/144,654, filed on Jan. 8, 2021, now Pat. No. 11,192,414.

(60) Provisional application No. 63/198,361, filed on Oct. 13, 2020.

(51) Int. Cl.
*B60G 3/18* (2006.01)

(52) U.S. Cl.
CPC .......... *B60G 3/18* (2013.01); *B60G 2200/144* (2013.01); *B60G 2200/44* (2013.01); *B60G 2204/43* (2013.01); *B60G 2800/162* (2013.01)

(58) Field of Classification Search
CPC .............. B60G 3/18; B60G 2200/144; B60G 2200/44; B60G 2204/43; B60G 2800/162
See application file for complete search history.

(56) References Cited

U.S. PATENT DOCUMENTS

| 1,888,801 | A | 11/1932 | Herold |
| 2,525,622 | A | 10/1950 | Shafer |
| 2,566,421 | A | 9/1951 | Lapointe |
| 2,715,712 | A | 8/1955 | William |
| 2,776,721 | A | 1/1957 | Dante |
| 2,779,642 | A | 1/1957 | Matthews |
| 2,921,450 | A | 1/1960 | Klomp |
| 4,611,681 | A | 9/1986 | Krude et al. |
| 4,705,292 | A | 11/1987 | Hespelt et al. |
| 4,708,361 | A | 11/1987 | Takada et al. |
| 4,714,270 | A | 12/1987 | Rumpel |
| 4,723,791 | A | 2/1988 | Miura et al. |

(Continued)

FOREIGN PATENT DOCUMENTS

| CN | 109017183 A | 12/2018 |
| CN | 109664702 A | 4/2019 |

(Continued)

OTHER PUBLICATIONS

Korean Intellectual Property Office, International Search Report and Written Opinion, dated Jan. 26, 2022.

*Primary Examiner* — Darlene P Condra
(74) *Attorney, Agent, or Firm* — Ryan Dean; Umberg Zipser LLP

(57) ABSTRACT

Multi-link suspension systems for vehicles are described having various linkages or links that connect to distinct points of a wheel mount or knuckle. Each of the linkages are preferably coupled to the wheel mount via a spherical ball joint and mounted such that they can independently move or rotate with respect to the other linkages. A shock assembly is preferably mounted between two of the linkages on a separate link and is rotatably mounted to each of the two linkages.

22 Claims, 35 Drawing Sheets

(56) References Cited

U.S. PATENT DOCUMENTS

| | | |
|---|---|---|
| 4,819,959 A | 4/1989 | Inoue et al. |
| 4,863,188 A | 9/1989 | Killian |
| 5,284,353 A | 2/1994 | Shinji et al. |
| 5,415,427 A | 5/1995 | Sommerer et al. |
| 5,421,606 A | 6/1995 | Chun |
| 5,507,510 A | 4/1996 | Kami et al. |
| 6,547,027 B1 | 4/2003 | Kalhok et al. |
| 6,767,022 B1 | 7/2004 | Chevalier |
| 6,783,136 B2 | 8/2004 | Timoney et al. |
| 6,945,547 B2 | 9/2005 | Ackley et al. |
| 7,004,484 B1 | 2/2006 | Chevalier |
| 7,048,286 B2 | 5/2006 | Eppelein |
| 7,258,355 B2 | 8/2007 | Amano |
| 7,343,997 B1 | 3/2008 | Matthies |
| 7,441,788 B2 | 10/2008 | Leclair |
| 7,591,337 B2 | 9/2009 | Suhre et al. |
| 7,744,104 B2 | 6/2010 | Kuwabara et al. |
| 7,845,452 B2 | 12/2010 | Bennett et al. |
| 7,891,684 B1 | 2/2011 | Luttinen et al. |
| 7,950,486 B2 | 5/2011 | Bronkhorst et al. |
| 7,954,835 B2 | 6/2011 | Nakamura et al. |
| 7,963,538 B2 | 6/2011 | Roland et al. |
| 8,079,602 B2 | 12/2011 | Kinsman et al. |
| 8,444,160 B2 | 5/2013 | Okamoto et al. |
| 8,454,041 B2 * | 6/2013 | Fujii .................. B60G 3/20 280/124.135 |
| 8,646,787 B2 | 2/2014 | Langhoff et al. |
| 8,944,449 B2 | 2/2015 | Hurd et al. |
| 9,216,625 B2 | 12/2015 | Ruiz |
| 9,238,394 B2 | 1/2016 | Leibl |
| 9,434,230 B2 | 9/2016 | Schmitt et al. |
| 9,469,174 B2 | 10/2016 | Mohrlock et al. |
| 9,561,818 B2 | 2/2017 | Uchihara |
| 9,586,613 B2 | 3/2017 | Shinbori et al. |
| 9,884,647 B2 | 2/2018 | Peterson et al. |
| 9,944,142 B2 | 4/2018 | Mohrlock |
| 9,981,519 B2 | 5/2018 | Despres-Nadeau et al. |
| 10,315,696 B2 | 6/2019 | Gordon |
| 10,343,742 B2 | 7/2019 | Zawistowski |
| 10,350,955 B2 | 7/2019 | Langhoff et al. |
| 10,399,401 B2 | 9/2019 | Schlangen et al. |
| 10,442,263 B2 | 10/2019 | Gordon |
| 10,457,140 B2 | 10/2019 | Bennett et al. |
| 10,525,781 B2 | 1/2020 | Upah et al. |
| 10,532,772 B2 | 1/2020 | Upah et al. |
| 10,800,224 B2 | 10/2020 | Sellars et al. |
| 10,821,794 B2 | 11/2020 | Nakashima et al. |
| 2004/0140641 A1 | 7/2004 | Eppelein |
| 2005/0072613 A1 | 4/2005 | Maltais et al. |
| 2005/0275183 A1 | 12/2005 | Amano |
| 2007/0018419 A1 * | 1/2007 | Kinouchi .................. B60G 3/20 280/124.144 |
| 2007/0074925 A1 | 4/2007 | Seki et al. |
| 2008/0042391 A1 * | 2/2008 | Holland .................. B60G 3/20 280/124.1 |
| 2009/0218783 A1 | 9/2009 | Brandl et al. |
| 2010/0264616 A1 | 10/2010 | Gell et al. |
| 2011/0309600 A1 | 12/2011 | Allsop et al. |
| 2012/0043736 A1 | 2/2012 | Okamoto et al. |
| 2018/0281540 A1 | 10/2018 | Gordon |
| 2018/0281853 A1 | 10/2018 | Gordon |
| 2019/0001782 A1 | 1/2019 | Anderson et al. |
| 2019/0009632 A1 | 1/2019 | Holt et al. |
| 2019/0134520 A1 | 5/2019 | Egli et al. |
| 2019/0225041 A1 | 7/2019 | Upah et al. |
| 2019/0256136 A1 | 8/2019 | Gordon |
| 2019/0299737 A1 | 10/2019 | Sellars et al. |
| 2019/0381847 A1 | 12/2019 | Kumagai et al. |
| 2020/0148019 A1 | 5/2020 | McConville et al. |
| 2020/0148264 A1 | 5/2020 | Daikoku et al. |
| 2020/0189341 A1 | 6/2020 | Shin et al. |

FOREIGN PATENT DOCUMENTS

| | | |
|---|---|---|
| CN | 109677221 A | 4/2019 |
| CN | 208962797 U | 6/2019 |
| CN | 110861455 A | 3/2020 |
| DE | 7027784 U | 1/1972 |
| DE | 1938850 C3 | 6/1981 |
| DE | 102010030292 A1 | 12/2011 |
| DE | 102016212662 A1 | 1/2018 |
| DE | 102017219778 A1 | 5/2019 |
| EP | 1958797 A1 | 8/2008 |
| EP | 3356176 B1 | 4/2020 |
| JP | 2823854 B2 | 11/1998 |
| KR | 1020080054809 A | 6/2008 |
| WO | 2017120509 A1 | 7/2017 |
| WO | 2017191023 A1 | 11/2017 |
| WO | 2019078120 A1 | 4/2019 |
| WO | 2019204717 A1 | 10/2019 |

* cited by examiner

SUSPENSION SYSTEM

This application is a continuation-in-part application of U.S. non-provisional patent application having Ser. No. 17/144,654 filed on Jan. 8, 2021, which itself claims priority to U.S. provisional patent application having Ser. No. 63/198,361 filed on Oct. 13, 2020. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is suspension systems for vehicles, and specifically off-road capable vehicles with a large range of suspension travel.

BACKGROUND

The following description includes information that may be useful in understanding the present invention. It is not an admission that any of the information provided herein is prior art or relevant to the presently claimed invention, or that any publication specifically or implicitly referenced is prior art.

Typical suspension designs for vehicles are designed around creating an offset axis point on the center of the tire mass and lining up to one axis point at the bottom of the tire contact patch. This causes the suspension arm under vehicle load to be static, not dynamic.

To the inventor's knowledge, there are currently no suspension systems that allow spring and shock control to a moving or virtual pivot shared between two or more separate links while also including a multiple link control to the wheel mount (or spindle) to create a virtual pivot.

Suspension systems exist that have a three-point pivoting control arm on the top and bottom of a wheel mount (also termed spindle, upright or knuckle). However, such systems typically have wheel and tire packaging issues when trying to reach the correct tire axis geometry.

While "V-type" suspension geometry provides the correct tire axis point by moving the single outer pivot into two separate pivots that geometrically converge on to one axis point, vehicles with such systems typically do not share the load of the shock or spring with more than one link point. Instead, such vehicles use a single link or the spindle/knuckle to mount the shock and/or spring.

Generally, where multi-link suspension systems have been used, vehicles having such systems require very little travel or movement within the suspension system, in contrast to off-road vehicles that require large amounts of travel within the suspension system. Shocks in off-road vehicles are also understandably larger than shocks on vehicles used for road racing, and generally have been mounted to the spindle or a single suspension link. While prior art inventions exist using four link or multi-link vehicle suspensions, those known to Applicant all fail to permit spring and shock control to a moving or virtual pivot shared between two or more separate links while also including a multiple link control to the wheel mount (or spindle) to create a virtual pivot.

As one example, U.S. Pat. No. 4,819,959A (Mazda) published Oct. 31, 1986 discloses a four link suspension system but lacks any discussion about mounting the spring and damper system. In another example, U.S. Pat. No. 7,048,286 published May 23, 2006 also discloses a multi-link suspension where the spring damper assembly connects to only one of the links. Other embodiments of multi-link suspension systems are described in U.S. Pat. No. 4,863,188 published Sep. 5, 1989; U.S. Pat. No. 9,469,174 published Oct. 18, 2016; U.S. Pat. No. 10,821,794 published on Nov. 3, 2020, and Japan Pat. No. 2,823,854 published Nov. 11, 1998.

It is also known to utilize a multi-link suspension where the spring damper assembly connects to the wheel mount, such as described in U.S. Pat. No. 7,258,355 published on Aug. 21, 2007; U.S. Pat. No. 7,963,538 published on May 8, 2008; U.S. Pat. No. 8,444,160 published on May 21, 2013; and DE Publ. No. 102016212662.

Finally, there are a number of prior examples of suspension systems having upper and lower A-arms, where a spring and damper system is rigidly bolted to one of the A-arms. Exemplary systems are described in U.S. Pat. No. 9,981,519 to Nadeau published Dec. 1, 2016; U.S. Pat. Publ. No. 2018/0281538 to Gordon published Oct. 4, 2018; and U.S. Pat. No. 8,079,602 to Kinsman published Dec. 20, 2011.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for a multi-link suspension system for a vehicle providing sufficient support for a shock assembly while also allowing for individual pivoting or movement of each of the links of the system.

SUMMARY OF THE INVENTION

The inventive subject matter provides apparatus, systems and methods for suspension systems for vehicles. Such vehicles could include, for example, automobiles, trucks, all-terrain vehicles, snowmobiles and any other vehicle that requires an accurate level of control and function. The novel suspension systems disclosed herein allows the suspension reaction to vertical loads to be decoupled to suspension movement in reaction to horizontal forces, which can be large. This is especially important in off-road applications. In addition, the contemplated suspension systems can decouple the vertical and horizontal loads and mitigate that input the chassis also mitigate those forces acting on the steering, resulting in the reduction or elimination of such forces. This advantageously can greatly reduce driver/operator fatigue and enhance driver and rider comfort.

The inventive subject matter described herein provides a novel solution to the inherent problems with suspension designs of the prior art. It drastically reduces feedback to the driver/operator in rough terrain without the aid of a stabilizer or dampener. This is accomplished without creating a reduction in the steering feel, but rather only a reduction in the steering forces, by reducing the overall force transmitted from the wheels through the suspension and to the steering wheel. The inventive subject matter also provides a novel way to mount shocks to change handling dynamics under rough terrain. The novel suspension systems described herein create additional pivot points within the suspension by attaching the shock to the system that sits between either the upper two linkages or links, or the lower two linkages or links.

These contemplated multi-link suspension systems, typically having four independent links that are connected to the knuckle and articulate to provide for vertical suspension travel and steering suspension articulation, allow the vehicle to decouple vertical loads from terrain (which are absorbed by vertical suspension travel) and frontal loads from crashing into obstacles, which are absorbed by the rigid yet articulating multi-link suspension system configured around its wheel center pivot points. This decoupling of the vertical and frontal loads seen at the tire allows the suspension system to behave differently in jounce and frontal impact in a way that does not send these loads to the driver through bump steer, and allows the driver to suffer less fatigue while operating the vehicle. This novel and optimized method of producing a vehicle suspension, specifically an off-road, high travel suspension, advantageously reduces steering forces while not reducing overall steering feel.

Preferred suspension systems comprise a plurality of links or linkages that couple a chassis of the vehicle to a wheel mount or knuckle. The wheel mount or knuckle preferably comprises an assembly having at least a wheel and a bearing assembly for contacting the ground at a corner of the vehicle. Each of the linkages attaches to the wheel mount at a distinct point, meaning that each of the linkages attaches to the wheel mount in distinct and separate locations from the others. It is also preferred that each of the linkages attaches to the vehicle's chassis at a distinct point.

It is contemplated that each of the linkages couples to the wheel mount via a spherical ball joint, such that each of the linkages can move or pivot independently of the other linkages. In preferred embodiments, at least some of the linkages are secured to the spherical ball joint via first and second fasteners disposed on opposite sides of the spherical ball joint. While bolts are preferred, any commercially suitable fasteners could be used that are configured to withstand the forces and stresses encountered when the vehicle is driven.

By utilizing two fasteners to secure the linkages to the spherical ball joint, this advantageously creates a double shear joint, which distributes the shear forces encountered by the joint leading to less likelihood that the joint and fasteners will fail.

In some embodiments, it is contemplated that four independent links or linkages could be used to couple the wheel mount/knuckle with the chassis. In such embodiments, it is preferred that each of the linkages are mounted at distinct points on the knuckle and chassis and are mounted to allow each of the linkages to move or pivot independently of the other linkages at both the chassis and the knuckle. It is further contemplated that a fifth linkage could include either a tie-rod or toe link and connect the steering column/system to the wheel mount to thereby allow for steering of the vehicle. The fifth linkage is also preferably mounted to the wheel mount at a distinct location and independently of the other four linkages.

It is especially preferred that the suspension system further comprises a spring and damper linkage or sixth link which is connected to two of the four linkages described above, preferably either the lower two linkages (front and back) or the upper two linkages (front and back). In this manner, the spring and damper linkage can be disposed between two suspension links. The first end of a shock assembly can be connected to the spring and damper linkage somewhere along its length. Alternative, a push rod or pull rod suspension design could be used, and that rod could instead be connected to the spring and damper linkage, or sixth link.

Preferably, the spring and damper linkage or sixth link is an extensible link, and more preferably, is a rotatably extensible system of links. In such embodiments, the spring and damper linkage allows for the links coupled or connected to the spring and damper linkage to continue to independently move or pivot without creating a mechanical bind. This is permitted because the spring and damper linkage can rotate relative to one or both of the links to which it is coupled by not being placed on the central axis of links to which it is coupled. The central axis of the links is defined by the center of the rotating joint at each end. While several of the rotatably extensible systems described herein are shown as having two suspension links which both have a point off the central axis of the link for the spring and damper linkage, the same concept could involve just one of the suspension links having an off axis connection point for the spring and damper link. One suspension link which moves twice as much in performing the rotatably extensible function is a similar yet different embodiment compared with two rotatably extensible links which move half as much.

The shock assembly is therefore able to move with the linkages in order to not interrupt the movement of the components within the multi-link suspension system. The spring and damper linkage is able to put the shock assembly at the optimal angle as the vehicle's suspension system is engaged. The spring and damper linkage can distribute the force absorbed through the shock assembly through the two linkages for strength, while not interrupting the multi-link suspension system.

By utilizing the above-described suspension system, the individualized movement of each of the linkages advantageously works to reduce and preferably eliminate any feedback received by the steering system such as when a wheel mounted to the wheel mount encounters an obstacle such as a rock. In prior art suspension systems, the driver of the vehicle would likely feel when the vehicle hits the obstacle due to sudden rotation of the steering wheel or handlebar. However, the above-described suspension system allows for such feedback to be substantially reduced and possibly eliminated such that the steering wheel or handlebar does not rotate or rotates insignificantly when an obstacle is struck by the wheel.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
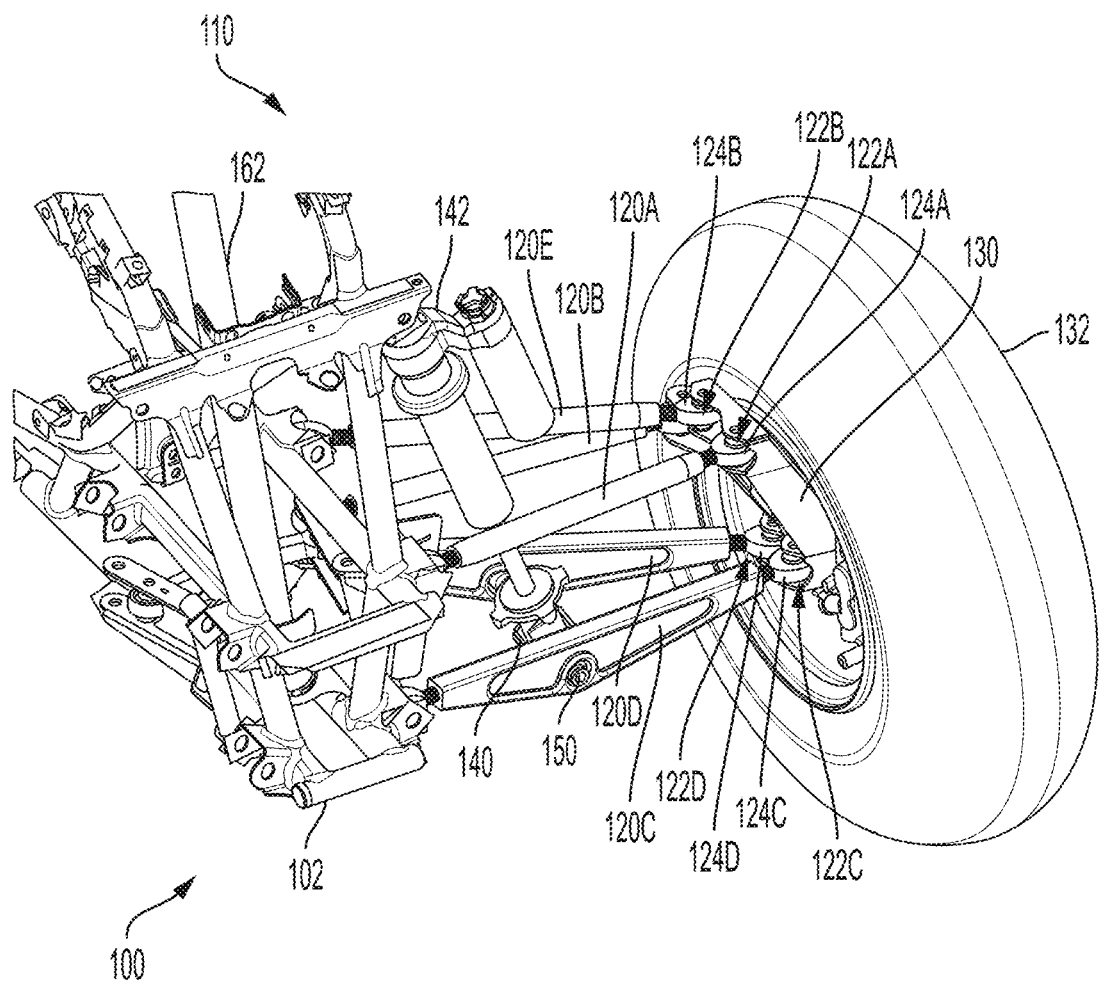
FIGS. 1-4 illustrate one embodiment of a suspension system for a vehicle.
Figure 2:
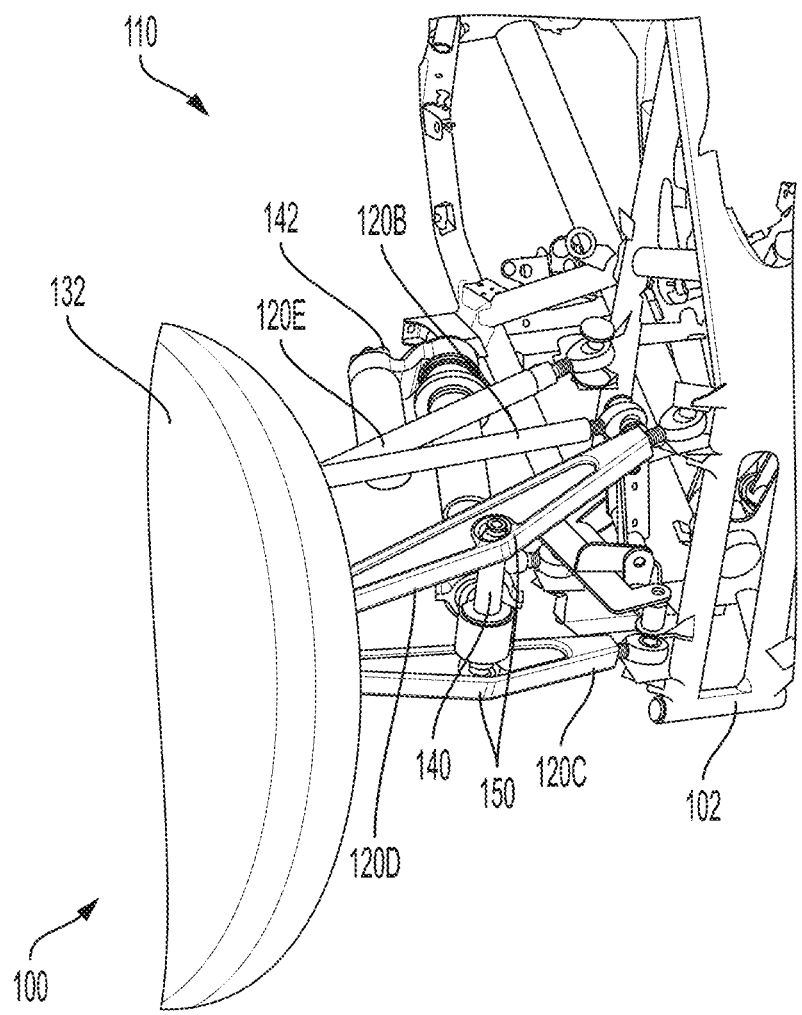
Figure 3:
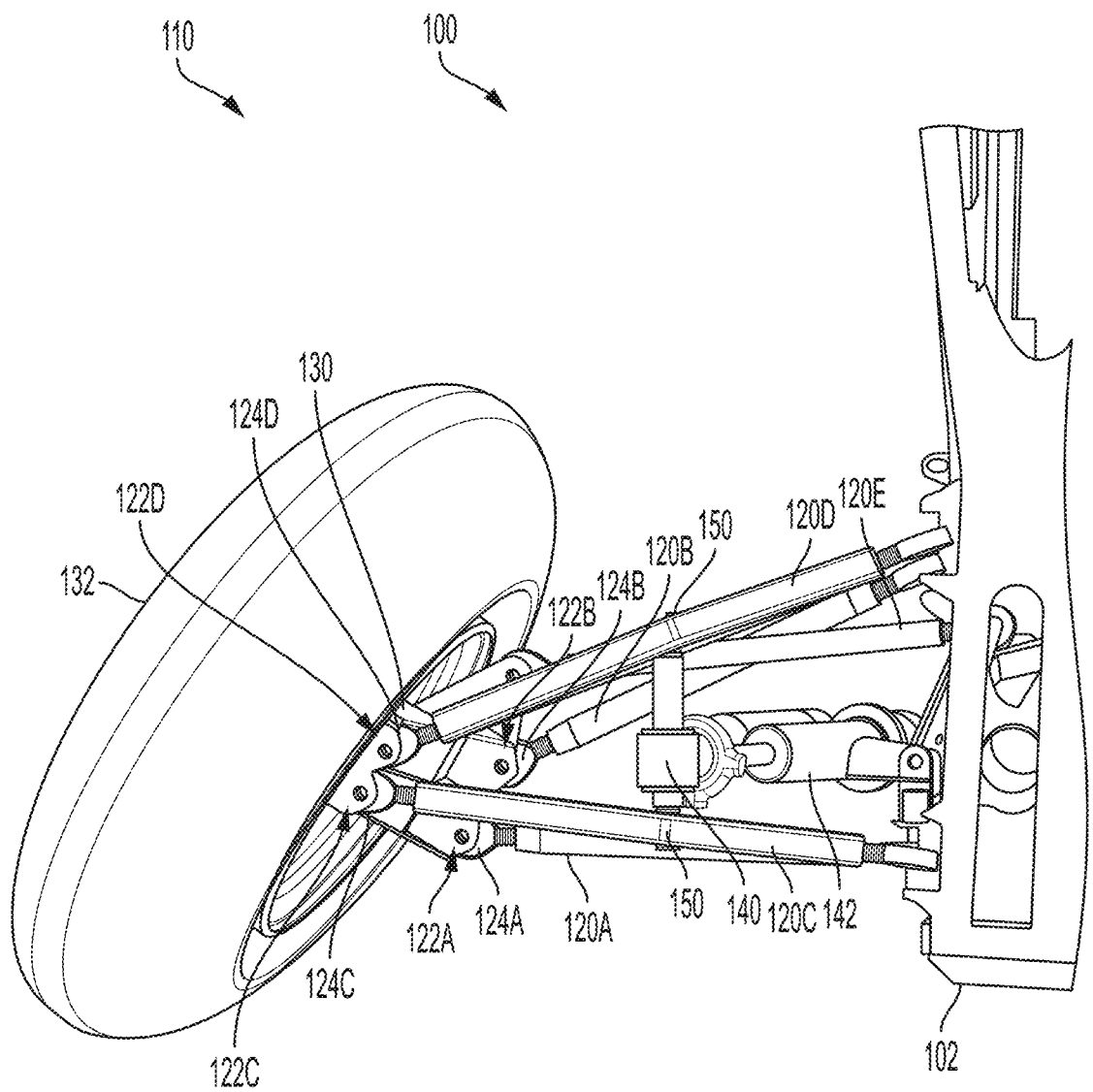
Figure 4:
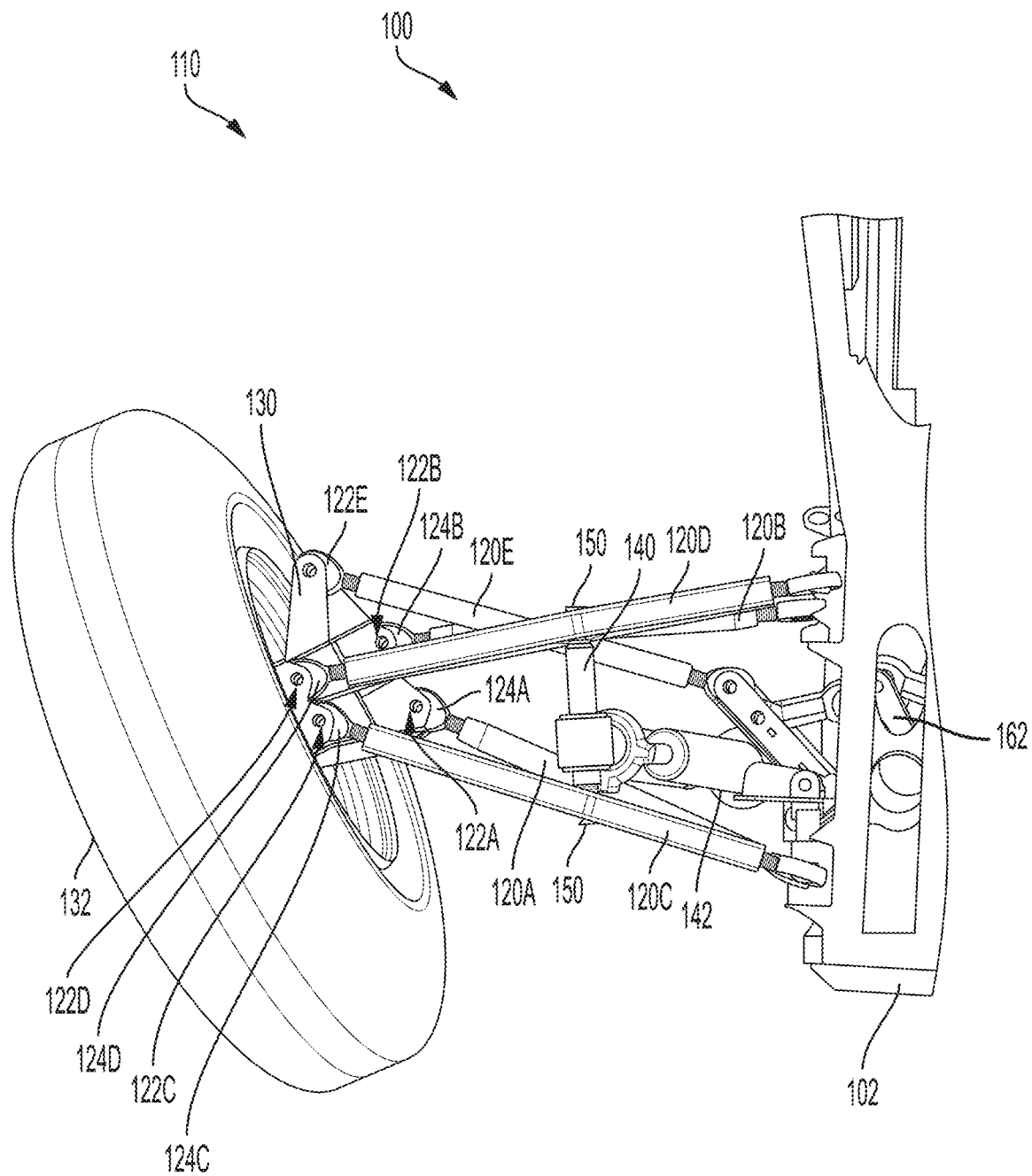
Figure 5:
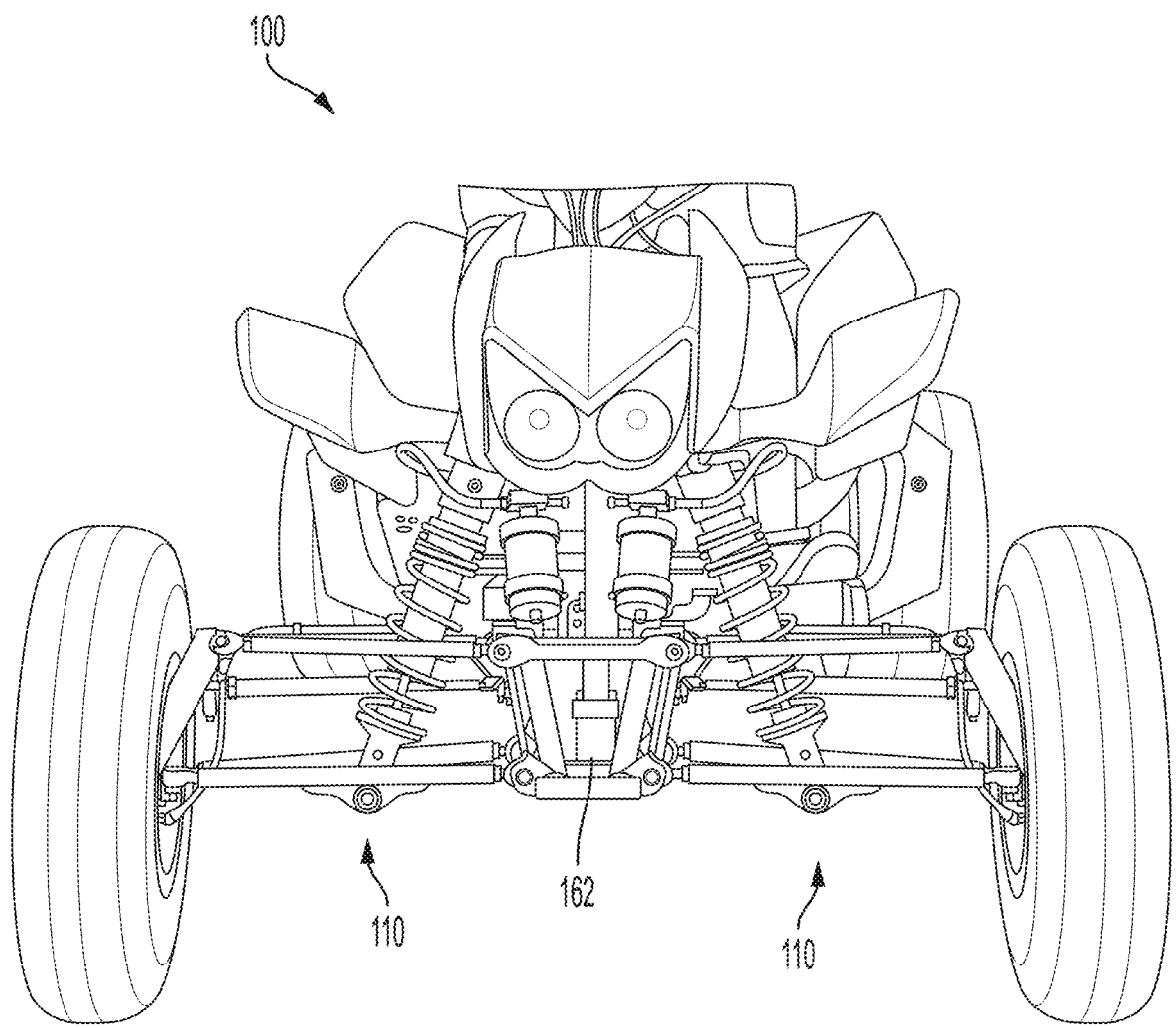
FIG. 5 illustrates one embodiment of an off-road vehicle having the suspension system on either side of the front of the vehicle.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

FIGS. 1-4 illustrates a suspension system 110 for a vehicle 100. Although vehicle 100 depicts an all-terrain vehicle, it is contemplated that the term "vehicle" as used herein could comprise an automobile, truck, all-terrain vehicle (ATV), utility terrain vehicle (UTV)/side-by-side, snowmobile, model or remote-controlled vehicle such as a radio-controlled car, an autonomous vehicle, or any other motorized vehicle that requires an accurate level of control and function.

The suspension system 110 comprises a first linkage or link 120A that couples to a first point 122A on an upper portion of a wheel mount 130 at a first end and a chassis 102 of the vehicle 100 at a second end. As shown, the wheel mount 130 connects to a wheel and tire 132. The suspension system 110 also comprises a second linkage or link 120B that couples to a second point 122B on the upper portion of the wheel mount 130 at a first end independent of the first linkage 120A, and that couples to the chassis 102 of the vehicle 100 at a second end independent of the first linkage 120A. As shown, the first point 122A and the second point 122B are distinct from one another.

The suspension system 110 further comprises a third linkage or link 120C and a fourth linkage 120D. The third linkage 120C couples to a third point 122C on a lower portion of the wheel mount 130 at a first end and the chassis 102 of the vehicle 100 at a second end. The fourth linkage or link 120D couples to a fourth point 122D on the lower portion of the wheel mount 130 at a first end and the chassis 102 of the vehicle 100 at a second end. As shown, the first point 122A, the second point 122B, the third point 122C and the fourth point 122D are distinct from one another, unlike the V-type suspension systems of the prior art where two or more linkages connect to the wheel mount at a single point.

Preferably, each of the linkages or links 120A-120D couple to the wheel mount via a spherical ball joint. The first end of the first linkage 120A couples to the first point 122A on the upper portion of the wheel mount 130 via a first spherical ball joint 124A. The first end of the second linkage 120B couples to the second point 122B on the upper portion of the wheel mount 130 via a second spherical ball joint 124B. The first end of the third linkage 120C couples to the third point 122C on the lower portion of the wheel mount 130 via a third spherical ball joint 124C, and the first end of the fourth linkage 120D couples to the fourth point 122D on the lower portion of a wheel mount 130 via a fourth spherical ball joint 124D.

Each of the linkages 120A-120D is preferably secured to its respective spherical ball joint 124A-124D via one or more bolts or other commercially suitable fasteners. It is especially preferred that at least two of the linkages are secured to their respective spherical ball joint via two fasteners, where each fastener is disposed on an opposite side of the spherical ball joint.

Thus, for example, in some embodiments, the first spherical ball joint 124A and the first end of the first linkage 120A can be secured to one another via first and second fasteners, with the first and second fasteners disposed on opposite sides of the first spherical ball joint 124A. Similarly, the second spherical ball joint 124B and the first end of the second linkage 120B are secured to one another via third and fourth fasteners, with the third and fourth fasteners disposed on opposite sides of the second spherical ball joint 124B.

In other embodiments, it is contemplated that the third spherical ball joint 124C and the first end of the third linkage 120C are secured to one another via fifth and sixth fasteners, with the fifth and sixth fasteners disposed on opposite sides of the third spherical ball joint 124C, and the fourth spherical ball joint 124D and the first end of the fourth linkage 120D are secured to one another via seventh and eighth fasteners, with the seventh and eighth fasteners disposed on opposite sides of the fourth spherical ball joint 124D.

As can be seen from the Figures, the first linkage 120A and the third linkage 120C connects a front portion of the wheel mount 130 to the chassis 102 of the vehicle 100, as shown for one embodiment with spherical bearings 126A and 126C. The second linkage 120B and the fourth linkage 120D connects a rear portion of the wheel mount 130 to the chassis 102 of the vehicle 100, as shown for one embodiment with spherical bearings 126B and 126D. Each of the first, second, third and fourth linkages 120A-120D are connected to the wheel mount 130 independent of one another and move and pivot independently of one another. In addition, each of the first, second, third and fourth linkages comprises a load-bearing arm to allow forces encountered by the wheel and wheel mount to be distributed among the linkages.

As shown in FIG. 1, a spring and damper linkage 140 is preferably connected to and disposed between two of the linkages, here the third linkage 120C and the fourth linkage 120D. Although shown disposed between the third linkage 120C and the fourth linkage 120D, it is contemplated that the spring and damper linkage 140 could alternatively be disposed between the first linkage 120A and the second linkage 120B.

Each of the third linkage 120C and the fourth linkage 120D preferably comprises a gusset 150 having an aperture 152 configured to receive a bolt or other commercially suitable fastener. While FIGS. 1-7 show the gusset 150 mounted to a lower portion of each of the third linkage 120C and the fourth linkage 120D, it is contemplated that the gusset could alternatively be mounted to (i) an upper portion of both of the third linkage 120C and the fourth linkage 120D, (ii) a lower portion of the third linkage 120C and an upper portion of the fourth linkage 120D, or (iii) an upper portion of the third linkage 120C and a lower portion of the fourth linkage 120D. It is important to note for this embodiment that exhibits the rotatably extensible functionality, that each of the links 124C, 150 and 126C are collinear. In later embodiments described below where the spring and damper link is a telescoping type member, links 120C and 120D can be collinear. While both the lower front link 120C and lower rear link 120D have point 150 off axis, a different embodiment (not depicted) could have only one of link 120D or link 120C have an off axis connection 150, which would then exhibit twice as much rotatably extensible movement versus both links having connection point 150 off the centerline axis of the link.

Figure 6:
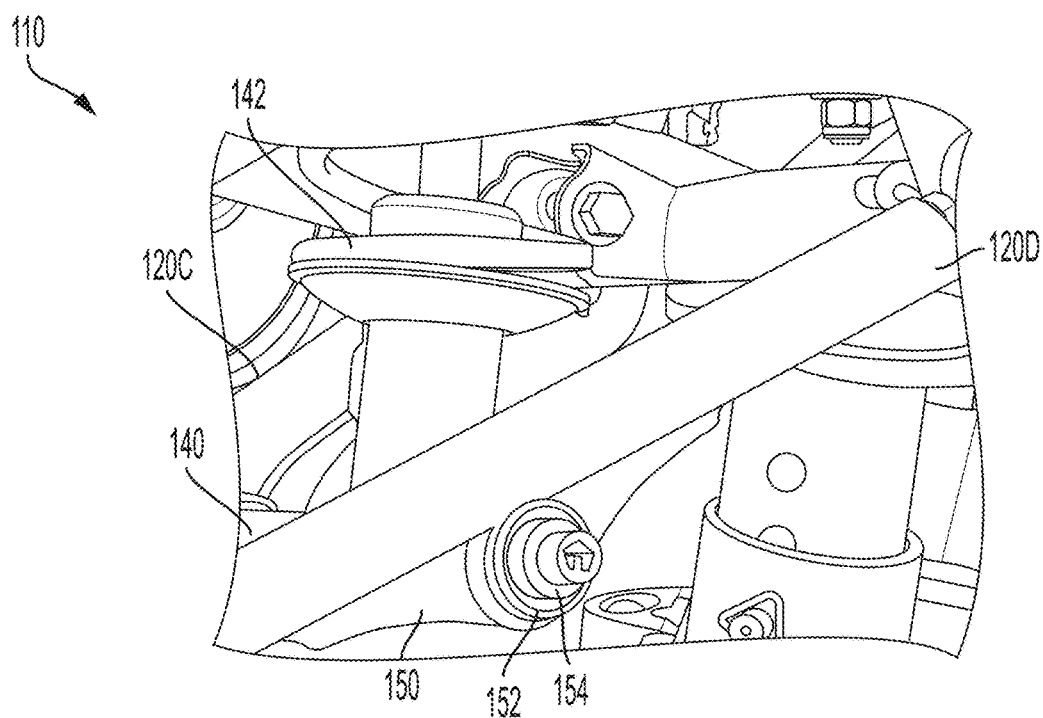
FIGS. 6-7 illustrate an enlarged view of one embodiment of a spring and damper linkage and shock assembly.

The aperture 152 is surrounded by a set of ball bearings 154 (see FIG. 6). Each end of the spring and damper linkage 140 abuts one of the apertures 152. The third linkage 120C and the fourth linkage 120D are preferably connected with a bolt, which extends through each of the holes of the gusset 150, the spring and damper linkage 140 and the basket 160 (and through the shock assembly 142 within the basket 160).

Figure 7:
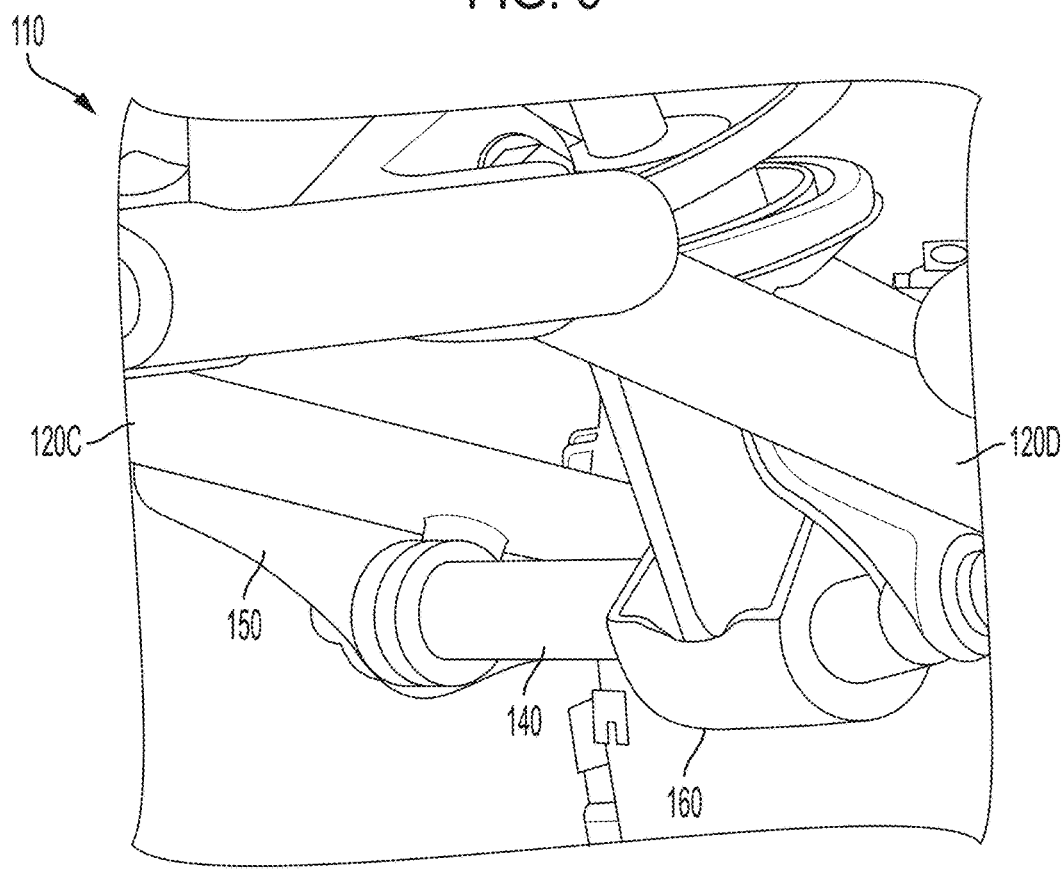

A shock assembly 142 is connected at a first end to the spring and damper linkage 140. As shown in FIG. 7, in some embodiments, the spring and damper linkage 140 further comprises a basket 160 that receives the shock assembly 142.

Preferably, the spring and damper linkage 140 is extensible such that the linkage 140 can accommodate for the motion of the suspension system 110 including both steering motion and the change in position of the linkages 120C, 120D as the vehicle 100 travels over bumps and undulations of the road or other surface. It is contemplated that the spring and damper linkage 140 can be telescoping and/or rotatably extensible. As used herein, rotatably extensible is used to mean that the linkage can rotate at both ends relative to the linkages 120C, 120D to effectively be extensible and accommodate the change in position of the linkages 120C, 120D without necessitating a telescoping member. While the spring and damper linkage 140 is attached to a lower portion near the center of the linkages 120C, 120D, and the linkages 120C, 120D can both rotate along their length freely to allow the off centerline articulation of the spring and damper linkage 140 mounted with spherical bearings at each end, as needed to perform the rotatably extensible functionality. In a different yet related embodiment, it is contemplated that only one of link 120C or 120D would need to be configured to exhibit rotatable extensible behavior with an off axis connection point 150, and the other of the two links could have on axis connection to the spring and damper linkage 140.

In some embodiments, the spring and damper linkage 140 comprises first and second ends and is configured to increase or decrease its length in response to a movement of one or both of the third linkage 120C and the fourth linkage 120D. In this manner, it is contemplated that the spring and damper linkage 140 could comprise telescoping cylinders or have another configuration permitting it to vary in length in response to movement of one or both of the linkages. In such embodiments, the spring and damper linkage 140 preferably lies within a plane defined by the third and fourth linkages 120C, 120D, and is linearly fixed and rotatable at one of the first and second ends and passes through a rotatable bearing system at the other end to accommodate movement of a fifth linkage or steering linkage 120E and/or the movement of the third and fourth linkages 120C, 120D during travel of the vehicle By mounting the shock assembly 142 on the spring and damper linkage 140, the spring and damper linkage 140 can distribute forces absorbed through the shock assembly through the two linkages 120C, 120D for strength, while not interrupting the balanced state between the forces distributed among the linkages, which is required in order to eliminate the feedback to the handlebar or steering wheel.

Although shown that the spring and damper linkage 140 is mounted to or lower surface of each of the third linkage 120C and the fourth linkage 120D, it is contemplated that the spring and damper linkage 140 could alternatively be mounted to an upper surface of each of the third linkage 120C and the fourth linkage 120D.

As can be seen in FIGS. 1-4, the spring and damper linkage 140 is preferably mounted to each of the third linkage 120C and the fourth linkage 120D, such that the spring and damper linkage 140 is non-orthogonal or off-normal relative to each of the third linkage 120C and the fourth linkage 120D. In other words, the angle as measured between the spring and damper linkage 140 and either of the third linkage 120C and the fourth linkage 120D is not equal to ninety degrees.

To allow steering of the vehicle 100, the suspension system 110 comprises a fifth linkage 120E that couples to a fifth point 122E of the wheel mount 130 at a first end and the steering system 162 of the vehicle 100 at a second end.

Although only one side of the suspension system 110 is shown in FIGS. 1-4, FIG. 5 illustrates vehicle 100 having a suspension system 110 on the front-left and front-right sides of the vehicle 100. So, in the above example, each of the left and right sides has a suspension system 110 as described above with the four linkages that individually couple to a wheel mount. A shock assembly can also be coupled to two of the linkages on each side of the vehicle 100, such as in the manner described above.

Figure 8:
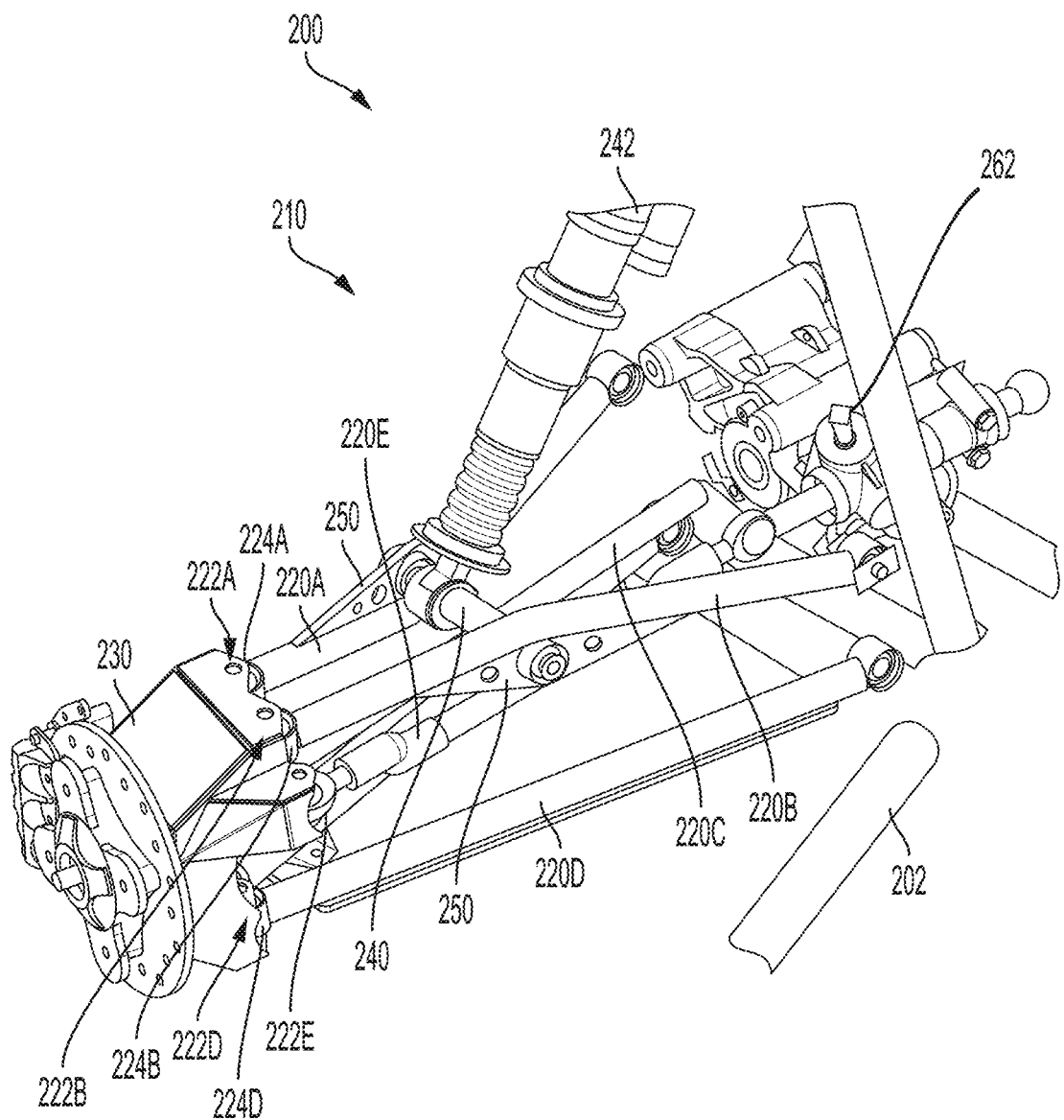
FIG. 8 illustrates another embodiment of a suspension system for a vehicle.
Figure 9:
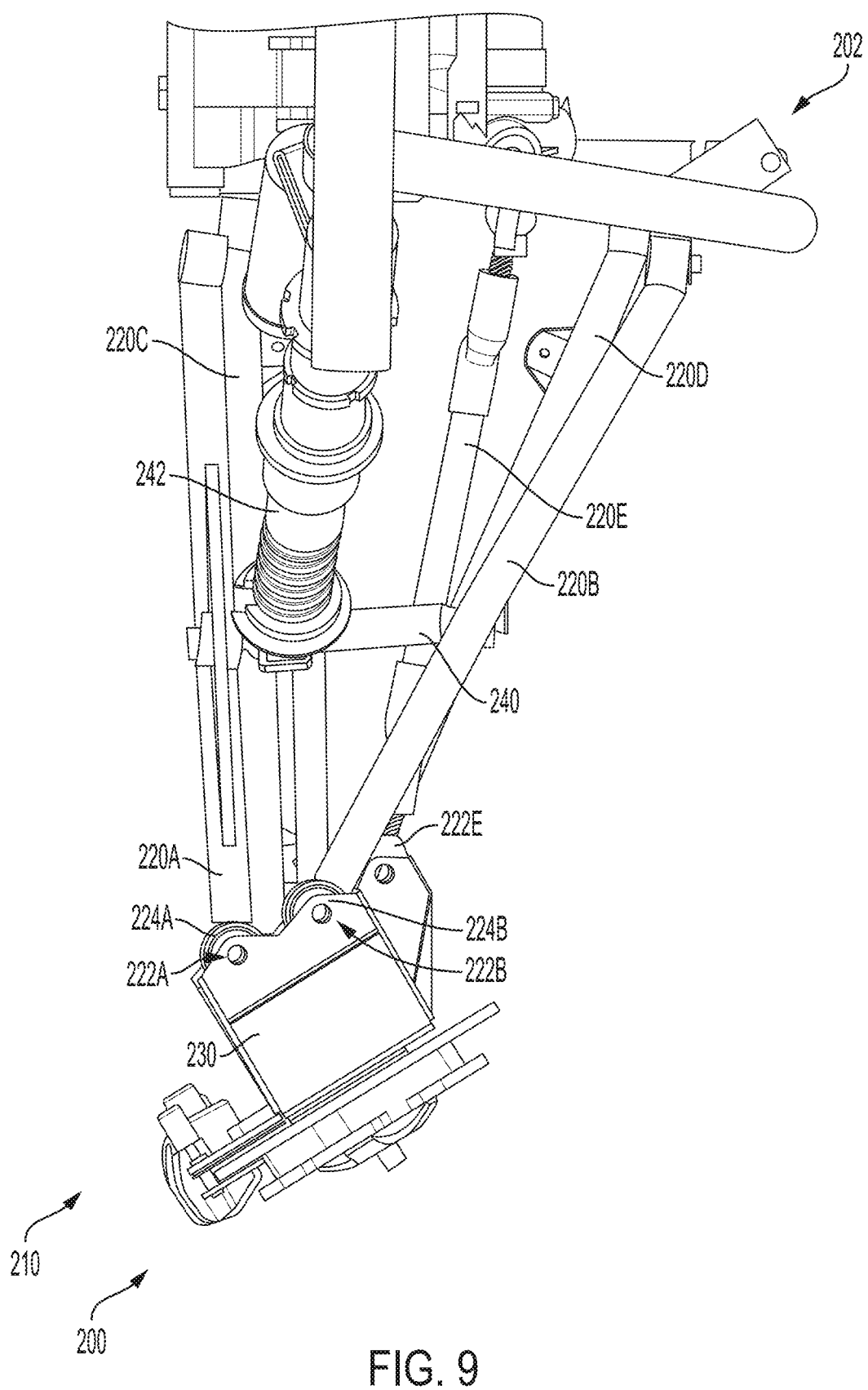
FIGS. 9-10 illustrate top views of the suspension system of FIG. 8 showing movement of the wheel mount and respective movement of the linkages.
Figure 10:
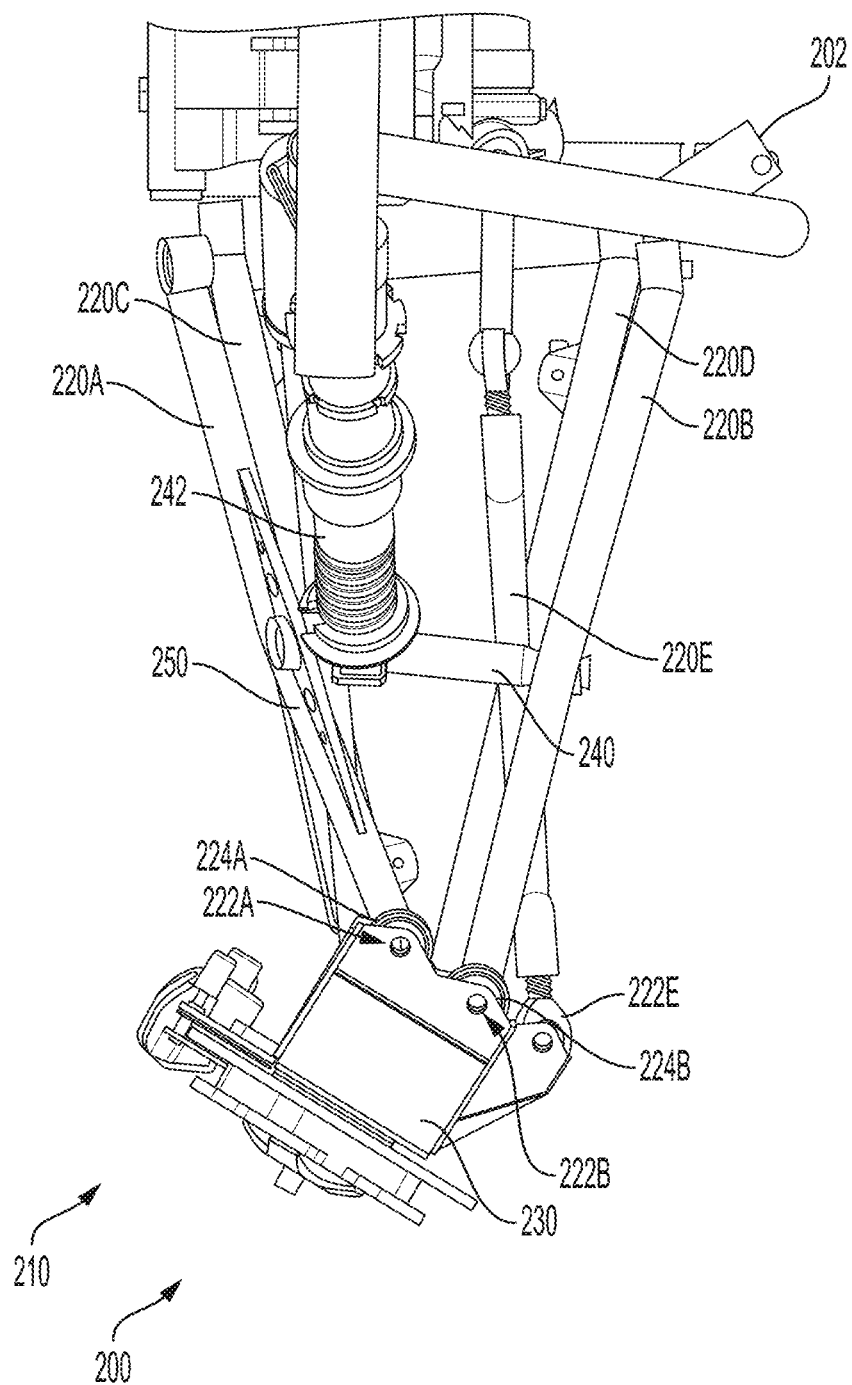

FIGS. 8-10 illustrates another embodiment of a suspension system 210 for a vehicle 200 having a chassis 202. Contemplated vehicles include those described above.

The suspension system 210 comprises a first linkage 220A that couples to a first point 222A on an upper portion of a wheel mount 230 at a first end and a chassis of the vehicle 200 at a second end. The suspension system 210 also comprises a second linkage 220B that couples to a second point 222B on the upper portion of the wheel mount 230 at a first end independent of the first linkage 220A, and that couples to the chassis of the vehicle 200 at a second end independent of the first linkage 220A. As shown, the first point 222A and the second point 222B are distinct from one another.

The suspension system 210 further comprises a third linkage 220C and a fourth linkage 220D. The third linkage 220C couples to a third point 222C on a lower portion of the wheel mount 230 at a first end and the chassis of the vehicle 200 at a second end. The fourth linkage 220D couples to a fourth point 222D on the lower portion of the wheel mount 230 at a first end and the chassis of the vehicle 200 at a second end. As shown, the first point 222A, the second point 222B, the third point 222C and the fourth point 222D are distinct from one another, unlike the V-type suspension systems of the prior art where two or more linkages connect to the wheel mount at a single point.

Preferably, each of the linkages 220A-220D couple to the wheel mount via a spherical ball joint. The first end of the first linkage 220A couples to the first point 222A on the upper portion of the wheel mount 230 via a first spherical ball joint 224A. The first end of the second linkage 220B couples to the second point 222B on the upper portion of the wheel mount 230 via a second spherical ball joint 224B. The first end of the third linkage 220C couples to the third point 222C on the lower portion of the wheel mount 230 via a third spherical ball joint 224C, and the first end of the fourth linkage 220D couples to the fourth point 222D on the lower portion of a wheel mount 230 via a fourth spherical ball joint 224D.

Each of the linkages 220A-220D is preferably secured to its respective spherical ball joint 224A-224D via one or more bolts or other commercially suitable fasteners. It is especially preferred that at least two of the linkages are secured to their respective spherical ball joint via two fasteners, where each fastener is disposed on an opposite side of the spherical ball joint.

Thus, for example, in some embodiments, the first spherical ball joint 224A and the first end of the first linkage 220A can be secured to one another via first and second fasteners, with the first and second fasteners disposed on opposite sides of the first spherical ball joint 224A. Similarly, the second spherical ball joint 224B and the first end of the second linkage 220B are secured to one another via third and fourth fasteners, with the third and fourth fasteners disposed on opposite sides of the second spherical ball joint 224B.

In other embodiments, it is contemplated that the third spherical ball joint 224C and the first end of the third linkage 220C are secured to one another via fifth and sixth fasteners, with the fifth and sixth fasteners disposed on opposite sides of the third spherical ball joint 224C, and the fourth spherical ball joint 224D and the first end of the fourth linkage 220D are secured to one another via seventh and eighth fasteners, with the seventh and eighth fasteners disposed on opposite sides of the fourth spherical ball joint 224D.

As can be seen from FIGS. 8-10, the first linkage 220A and the third linkage 220C connects a front portion of the wheel mount 230 to the chassis of the vehicle 200. The second linkage 220B and the fourth linkage 220D connects a rear portion of the wheel mount 230 to the chassis of the vehicle 200. Each of the first, second, third and fourth linkages 220A-220D are connected to the wheel mount 230 independent of one another and move and pivot independently of one another. In addition, each of the first, second, third and fourth linkages comprises a load-bearing arm to allow forces encountered by the wheel and wheel mount to be spread among the linkages.

A spring and damper linkage 240 is preferably connected to and disposed between two of the linkages, here the first linkage 220A and the second linkage 220B. Although shown disposed between the first linkage 220A and the second linkage 220B, it is contemplated that the spring and damper linkage 240 could alternatively be disposed between the third linkage 220C and the second linkage 220D, such as shown in FIGS. 1-4.

Each of the first linkage 220A and the second linkage 220B preferably comprises a gusset 250 having an aperture configured to receive a bolt or other commercially suitable fastener. While FIGS. 8-10 show the gusset 250 mounted to an upper portion of the first linkage 220A and a lower portion of the second linkage 220B, in alternative embodiments, it is contemplated that the gusset could be mounted to (i) a lower portion of the first linkage 220A and an upper portion of the second linkage 220B, (ii) a lower portion of both of the first linkage 220A and the second linkage 220B, or (iii) an upper portion of both of the first linkage 220A and the second linkage 220B.

The aperture is surrounded by a set of ball bearings, such as described above. Each end of the spring and damper linkage 240 abuts one of the apertures. The first linkage 220A and the second linkage 220B are preferably connected with a bolt, which extends through each of the holes of the gusset 250, the spring and damper linkage 240 and shock assembly 242.

Shock assembly 242 is connected at a first end to the spring and damper linkage 240. Preferably, the spring and damper linkage 240 is configured to increase or decrease its length in response to a movement of one or both of the first linkage 220A and the second linkage 220B. In this manner, it is contemplated that the spring and damper linkage 240 could comprise telescoping cylinders or have another configuration permitting it to vary in length in response to movement of one or both of the linkages.

As discussed above, by mounting the shock assembly 242 on the spring and damper linkage 240, the spring and damper linkage 240 can distribute forces absorbed through the shock assembly through the two linkages 220A, 220B for strength, while not interrupting the balanced state between negative and positive pressure among the linkages, which is required in order to eliminate the feedback to the handlebar or steering wheel.

As can be seen in FIGS. 8-10, the spring and damper linkage 240 is preferably mounted to each of the first linkage 220A and the second linkage 220B, such that the spring and damper linkage 240 is non-orthogonal or off-normal relative to each of the first linkage 220A and the second linkage 220B. In other words, the angle as measured between the spring and damper linkage 240 and either of the first linkage 220A and the second linkage 220B is not equal to ninety degrees.

It is further contemplated that a first plane can vertically bisect each of the first, second, third and fourth points 222A-222D where each of the first, second, third and fourth linkages 220A-220D couple to the wheel mount 230, respectively. A second plane can vertically bisect the shock assembly 242. Preferably, the second plane is not parallel to the first plane.

To allow steering of the vehicle 200, the suspension system 210 comprises a fifth linkage 220E that couples to a fifth point 222E of the wheel mount 230 at a first end and the steering system 262 of the vehicle 200 at a second end.

With respect to the remaining numerals in each of FIGS. 8-10, the same considerations for like components with like numerals of FIGS. 1-4 apply.

Figure 11:
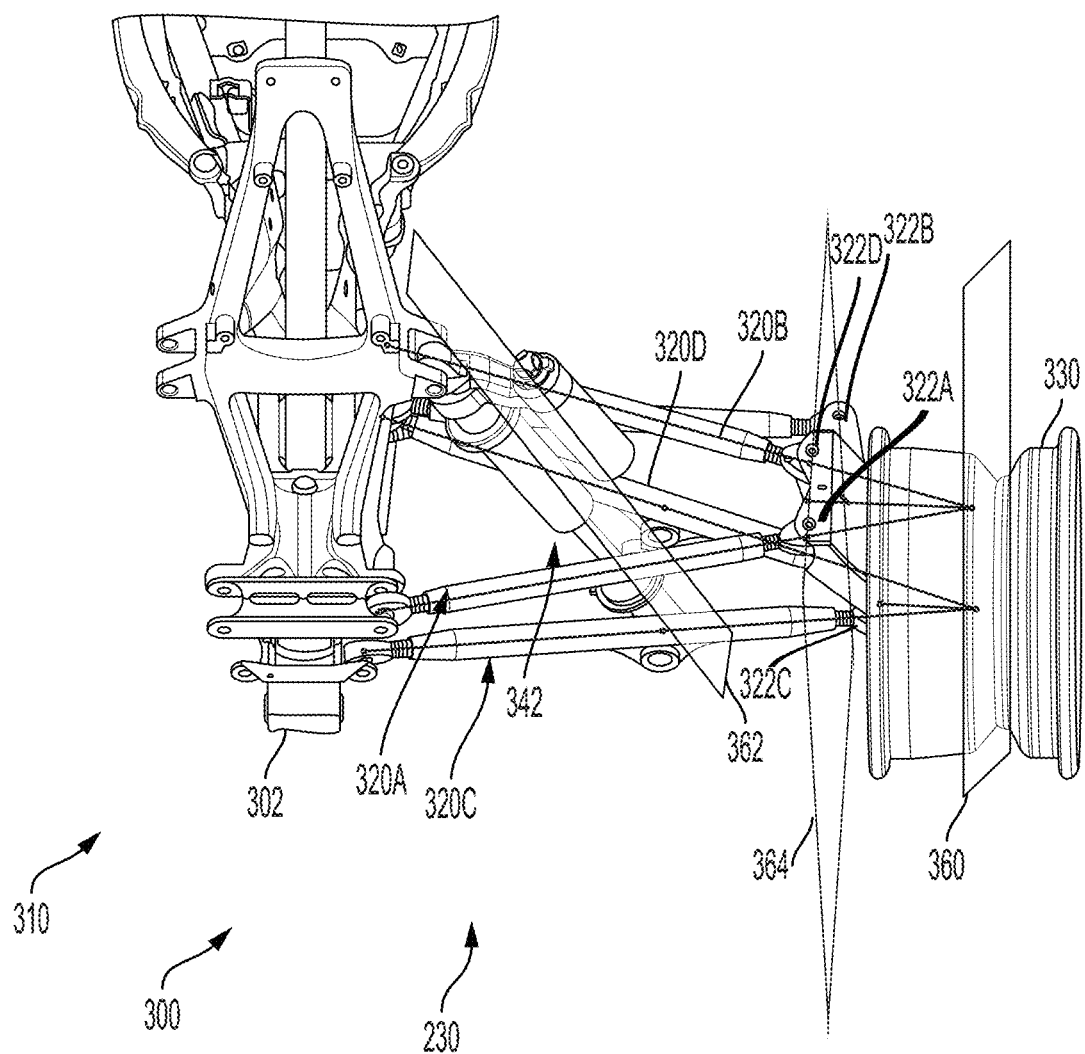
FIG. 11 illustrates another embodiment of a suspension system for a vehicle.

FIG. 11 illustrates an embodiment of a suspension system in which a first plane 360 can intersect the point where the axis of each of the first and second linkages 320A-320B meet and the point where the axis of each of the third and fourth linkages 320C-320D meet, preferably at or near a center line of the wheel mount 330. A second plane 362 can vertically bisect the shock assembly 342. Preferably, the second plane 362 is not parallel to the first plane 360. It is further contemplated that a third plane can bisect each of the first, second, third and fourth points 322A-322D where each of the first, second, third and fourth linkages 320A-320D couple to the wheel mount 330, respectively. A second plane can vertically bisect the shock assembly 342. Preferably, the second plane is not parallel to the third plane. In this arrangement of linkages 320A-320D, when the kingpin axis has a continuous path of instant centers instead of a single point of rotation, steering feedback forces to the driver are reduced during events which combine suspension travel and steering articulation, without sacrificing any of the steering "feel" by eliminating these forces.

Figure 12A:
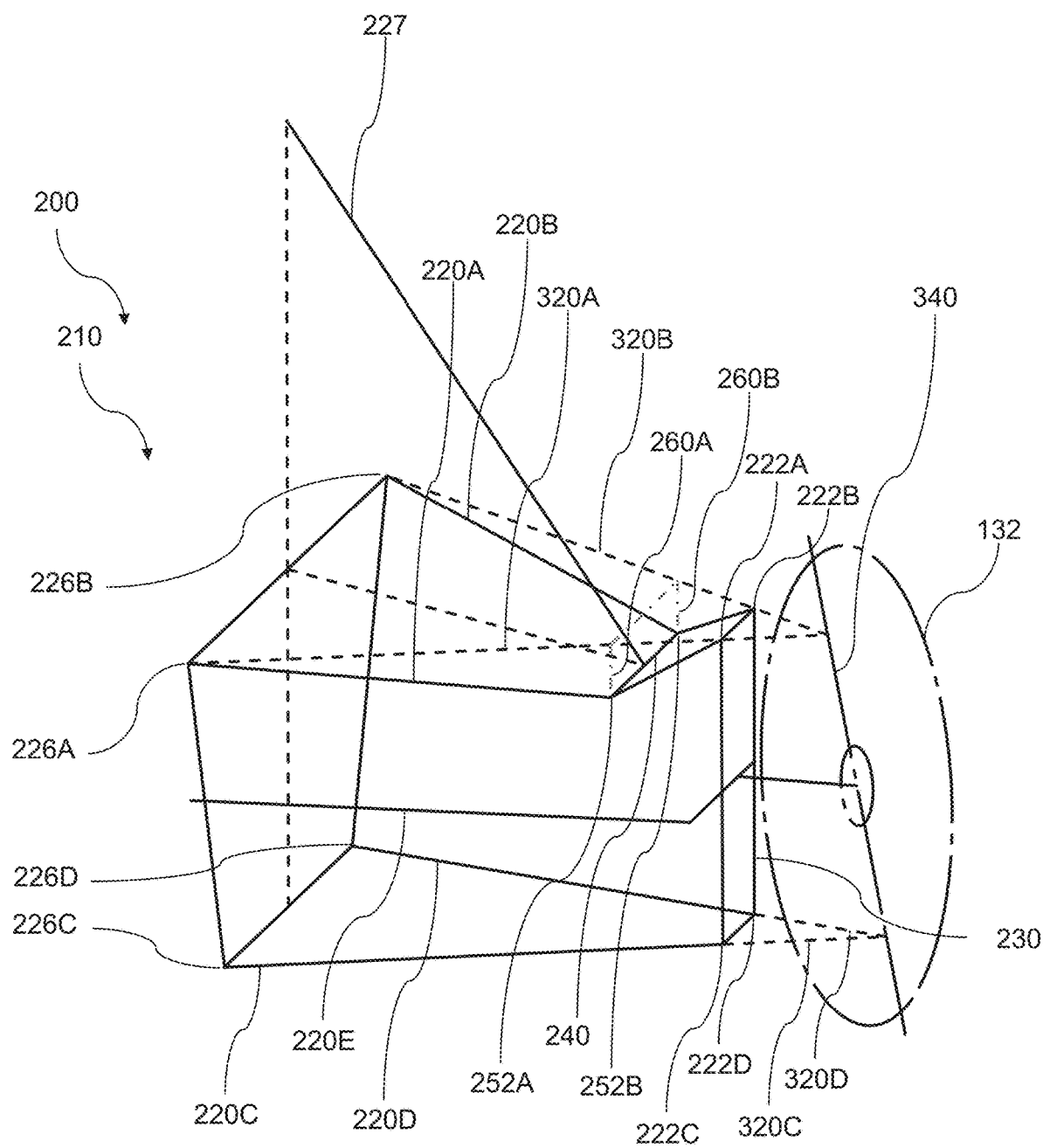
FIGS. 12A-12D illustrates various views of an embodiment of a rotatably extensible six link suspension system using simplified line drawings.

FIG. 12A depicts a simplified line drawing of the rotatably extensible embodiment of a six-link suspension system, with four independent links attached to a wheel mount. Also depicted is a front corner with a steering rack of a steering system within the frame, and a tie-rod attached to the steering system on one end and the steering pivot location on the other end. A sixth link (spring and damper assembly link) is disposed between two of the four independent links described above, in this case the upper two links. The spring and damper assembly link 240 attaches to an upper set of links 220A and 220B. In the wireframe of FIG. 12A, the upper front linkage 220A is depicted as a solid arm connecting points 226A, 252A and 222A. The upper rear linkage 220B is depicted as a solid arm connecting points 226B, 252B, and 222B. The aperture 252 is surrounded by a set of ball bearings (such as shown in FIG. 6), and in FIG. 12A the points of rotation are depicted by 252A and 252B, also depicted as the end points of spring damper link 240. In another embodiment (not depicted), it is contemplated that one of lines 260A or 260B could be of zero length, requiring that the non-zero length of the other of lines 260A or 260B would be twice as long so that the rotatably extensible behavior could be accomplished in the same manner.

Theoretical lines 320A and 320B show the pivot point where wheel rotation would be constrained by a conventional A-Arm suspension system made of a single, solid upper member with a single outboard ball joint. Line 340 depicts the kingpin axis, formed by a line connecting the intersection point of 320A and 320B on the upper portion and a line connecting the intersection point of 320C and 320D on the lower portion of this embodiment of the suspension system. Theoretical lines 320A and 320B also illustrate where conventional multi-link suspension systems of the prior art would be located to connect inboard points 226A, 226B, 226C and 226D from the chassis 200 to the wheel mount 230 at points 222A, 222B, 222C, and 222D. In the novel invention of this subject matter, lines 260A and 260B show the needed vertical spacing to enable the rotatably extensible behavior of the spring and damper assembly link 240 which prevents binding of the assembly, and is how vertical wheel loads and horizontal wheel loads can be de-coupled to reduce driver fatigue by reducing steering feedback forces, and enhancing comfort in the chassis.

Figure 12B:
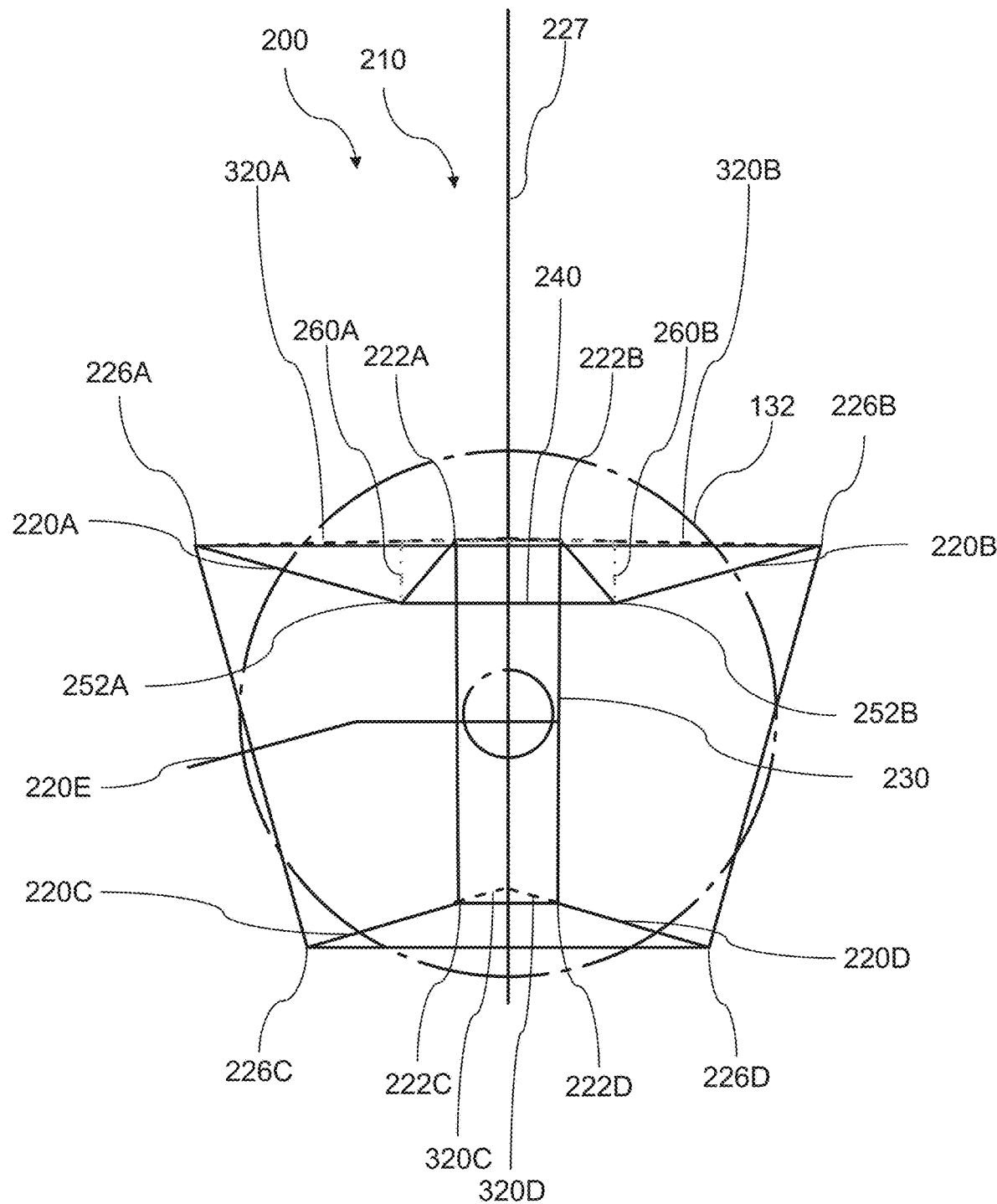
Figure 12C:
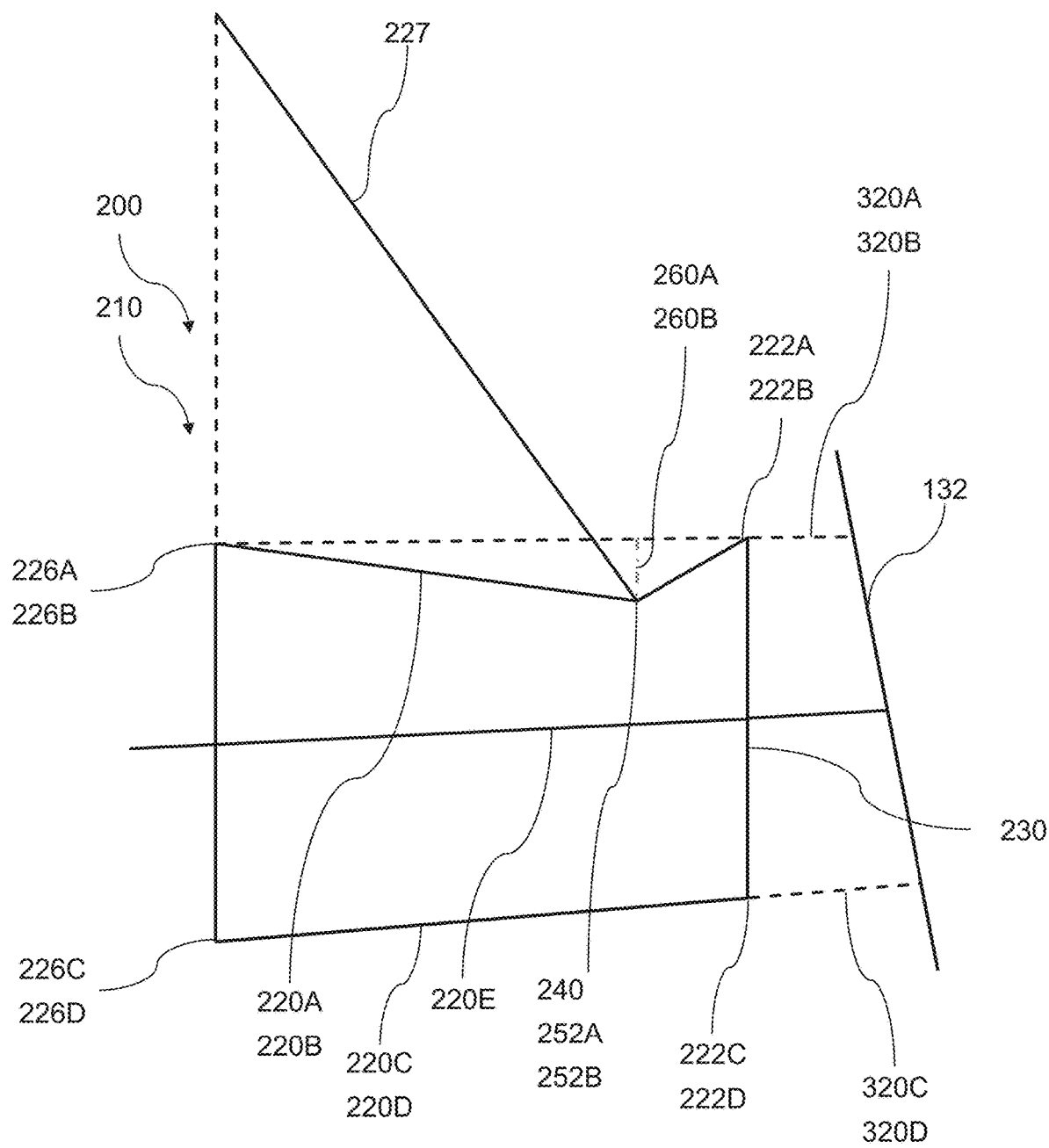
Figure 12D:
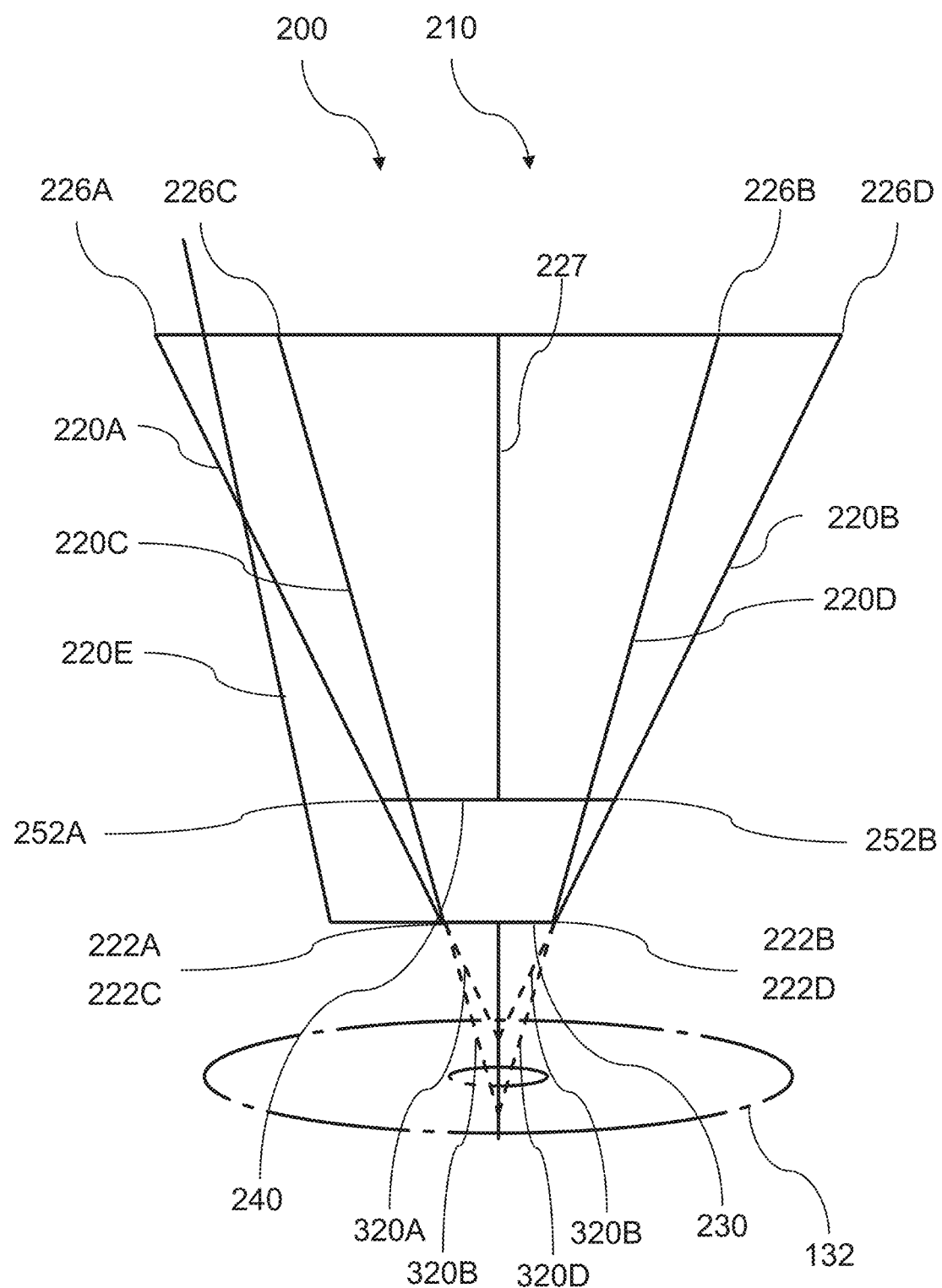

FIG. 12B, FIG. 12C, and FIG. 12D illustrate plane views of the wireframe sketch of FIG. 12A, with FIG. 12B illustrating the Vertical Longitudinal Plane, FIG. 12C illustrating the Vertical Transverse Plane, and FIG. 12D illustrating the Horizontal Plane. The rotatably extensible embodiment depicted in FIGS. 12A-12D contemplates mounting the suspension cross-link in a plane below the two connected links, and allowing all three links to rotate so that the spring and damper assembly link 240 takes on the properties of a telescoping or length changing link, while instead being rotatably extensible. The spring and damper assembly link 240 comprises the advantages of a telescoping member for the spring/damper attachment point but can be made entirely of sealed bearings that can withstand a harsh environment significantly better than a sliding or telescoping member could. The spring and damper assembly link 240 is depicted by illustrating a plane created by the three points of the upper rear independent suspension link 220B, and illustrating how this plane must rotate during suspension travel to accommodate the change in distance between the two suspension links to prevent vent binding of the spring and damper assembly link 240. This plane must also rotate to allow for steering motion, as the four independent links sweep out a changing kingpin axis and wheelbase as the suspension system is steered.

Figure 13:
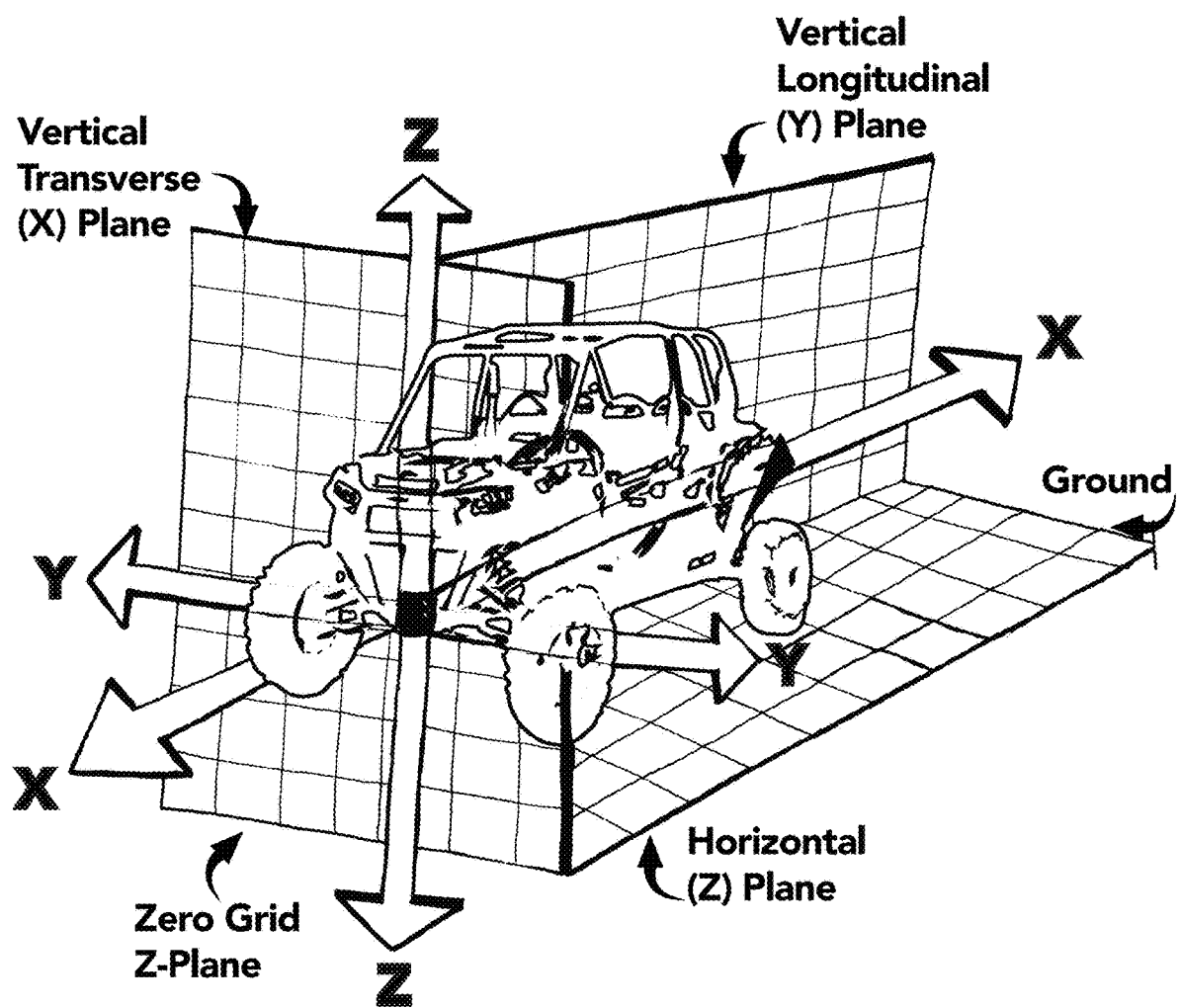
FIG. 13A illustrates vertical transverse, vertical longitudinal, and horizontal planes as used relative to a vehicle.
FIG. 13B illustrates perpendicular axes including yaw, pitch and roll relative to a vehicle.
FIG. 13C illustrates an exemplary diagram discussing the kingpin axis.
FIG. 13D illustrates an instant center K derived by the specific angles of the linkages or links relative to the chassis of the wheel mount or knuckle.
FIG. 13E illustrates the concept of Ackermann on the steered wheels of a vehicle.
Figure 13:
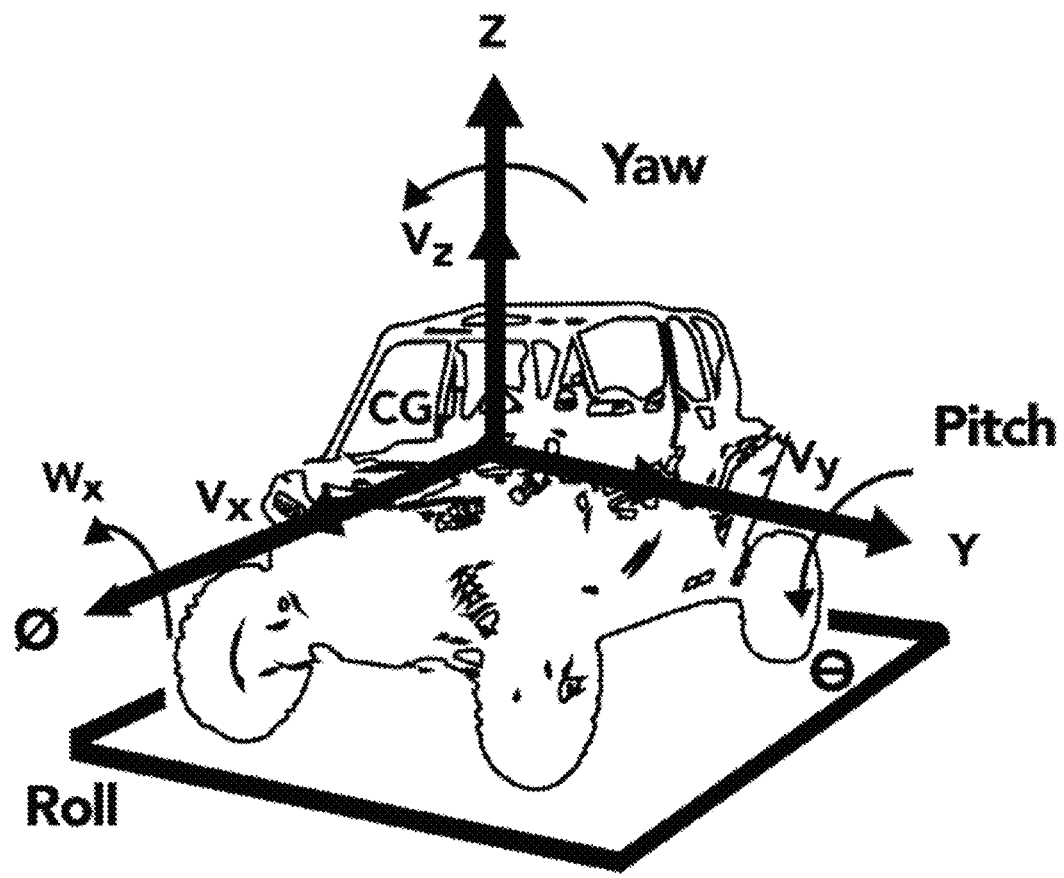

FIG. 13A illustrates perpendicular planes relative to a vehicle, while FIG. 13B illustrates perpendicular axes including yaw, pitch and roll relative to a vehicle.

Figure 13C:
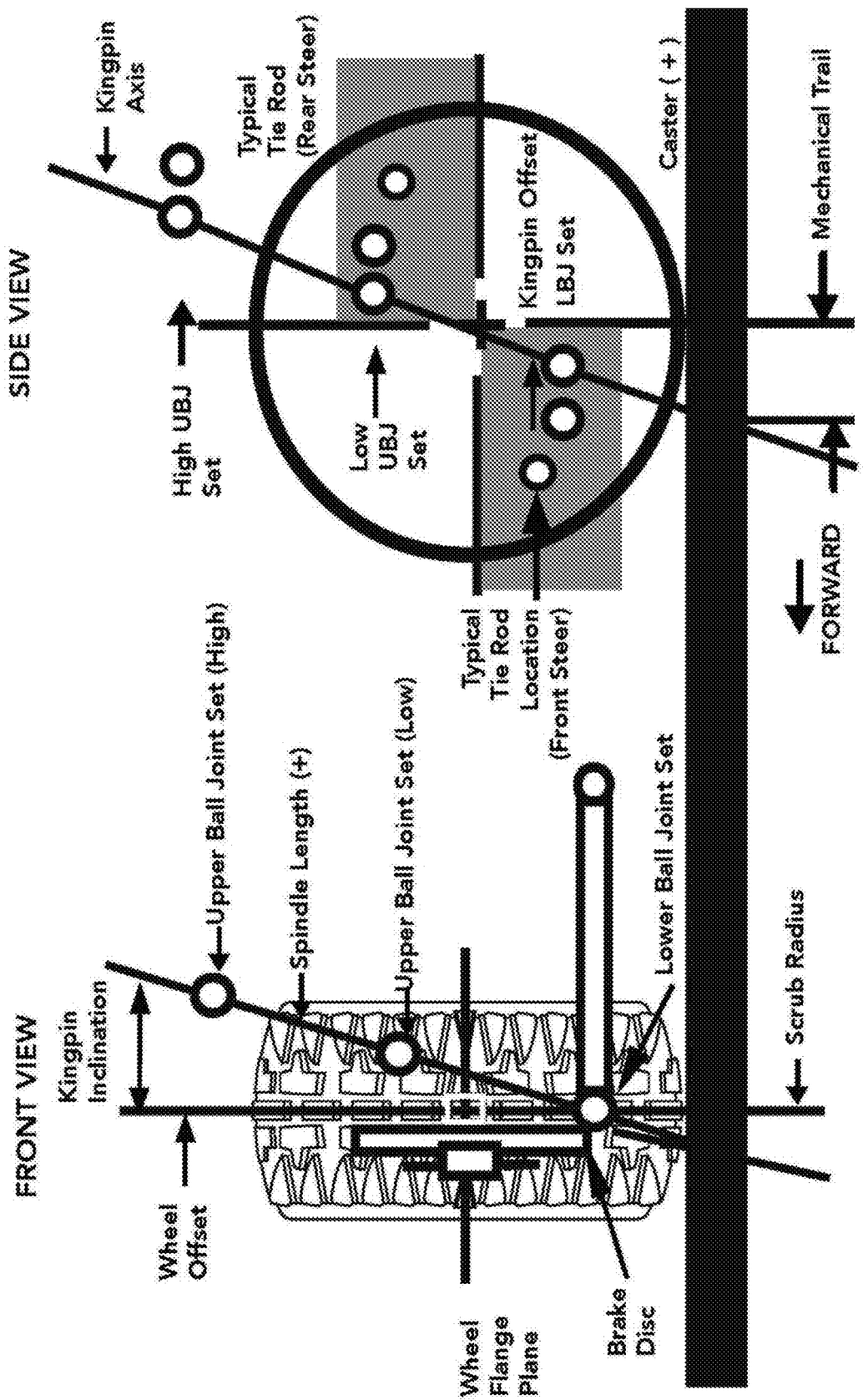

An exemplary diagram discussing the kingpin axis is shown in FIG. 13C, as well as multiple other terms of art associated with suspension systems that are used throughout the body of this document. It should be noted that two locations of the upper ball joints are introduced as terminating first and second links 420A, 420B with either a low (Low UBJ set; within the wheel and tire circumference) or high (High UBJ set; above the wheel and tire circumference) spacing shown connecting to the wheel mount 430. Only one of these locations would be selected based on the needs of the vehicle. Also depicted are two options for placing the steering connection link, named front steer or rear steer tie rod locations. As shown, the kingpin or steering axis is an imaginary plane intersecting (i) the ball joints (either upper ball joint High or Low UBJ-Hing or UBJ-Low) where the upper links connect to the knuckle 430 and (ii) where the lower links (third and fourth links 420C, 420D) connect to the knuckle 430. The difference between the kingpin axis and the wheel offset is the kingpin axis inclination or steering axis inclination. As shown in the FIG. 13C, the scrub radius is the distance between the wheel offset at the kingpin axis at the ground (here, a negative radius).

Figure 13D:
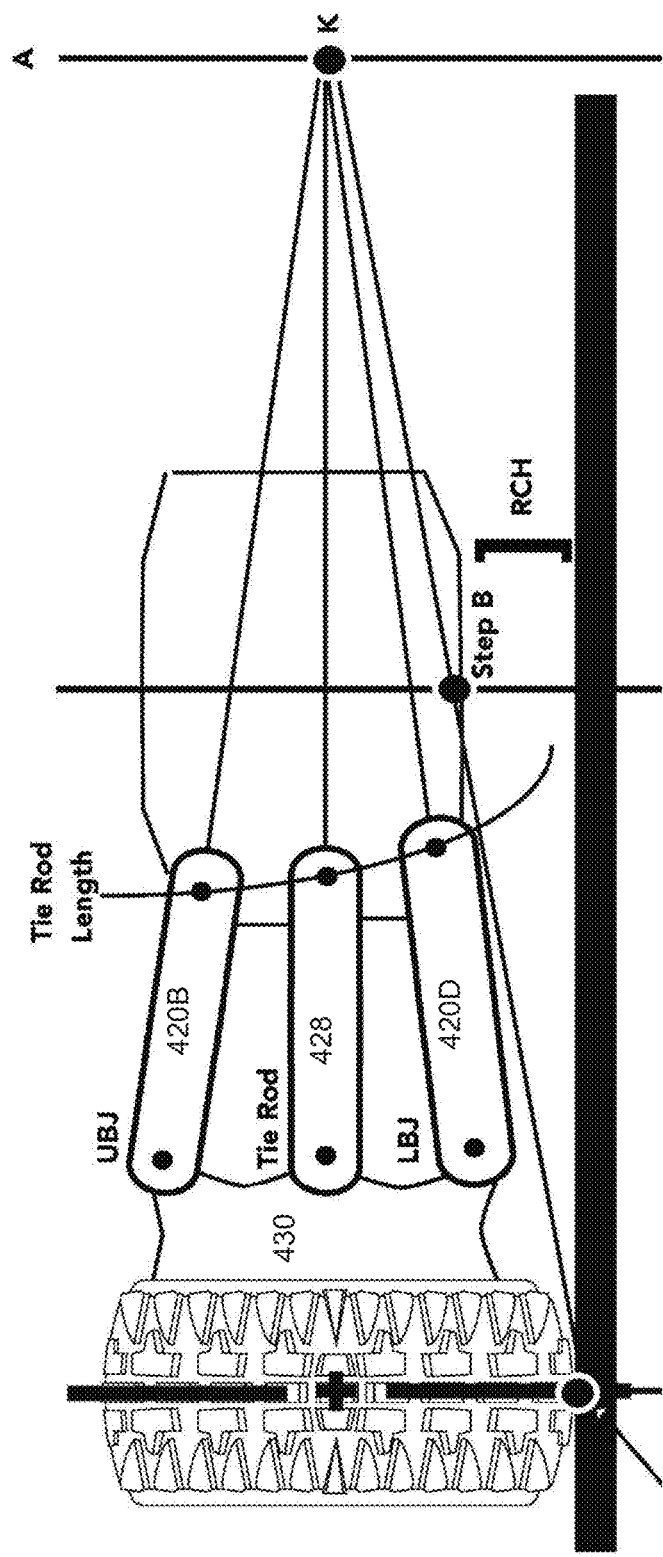

As shown in FIG. 13D, the upper links 420A (not shown) and 420B connect to the knuckle 430 at upper ball joints (UBJs) and the lower links 420C (not shown) and 420D connect to the knuckle 430 at lower ball joints (LBJs). The tie rod 428 comprising a portion of the steering link 420E also connects to the knuckle 430. The instant center is the point at which the lines bisecting each of the upper link 420B, tie rod 428, lower link 420D and the line from a point where the wheel contacts the ground surface (here, point K).

Because of the configuration discussed herein of the suspension system which permits the independent movement of each of the four links 420A-420D, a continuous path of instant centers occurs along plane A as the various links 420A-420D rotate with the movement of the wheel and knuckle 430. This advantageously reduces steering feedback forces to the driver and bump steer during suspension travel without sacrificing any of the steering "feel" by eliminating these forces. In addition, FIG. 13D depicts the calculation of the roll center height (RCH), by drawing a line from point K (the intersection of suspension links 420B and 420D) to the center of the contact patch, and measuring the distance at the centerline of the vehicle between this line and a vertical line from the ground. The 4 link embodiments of the suspension described here-in allow great freedom in the design and configuration of both roll center height and bump steer characteristics allowed.

Figure 13E:
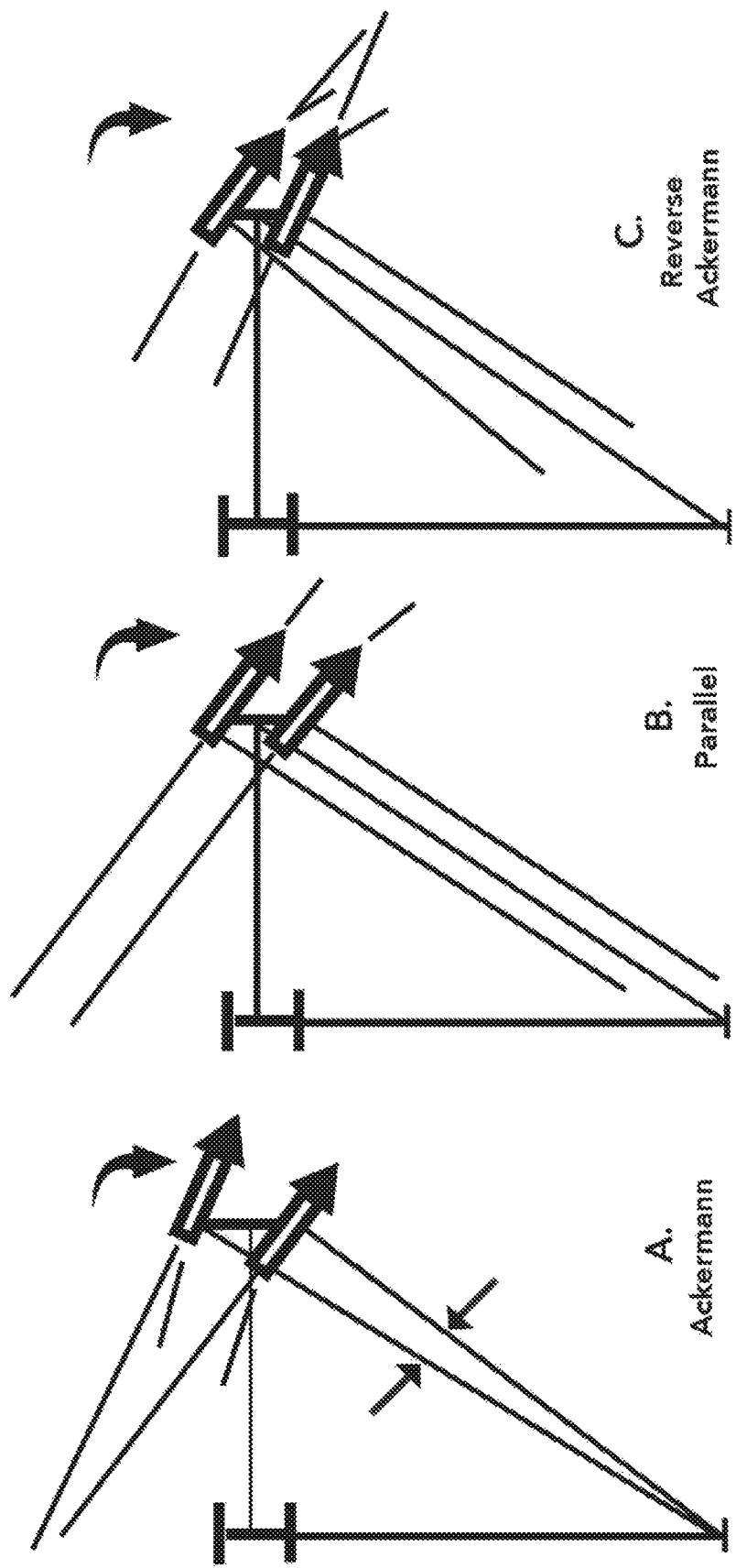
Figure 15A:
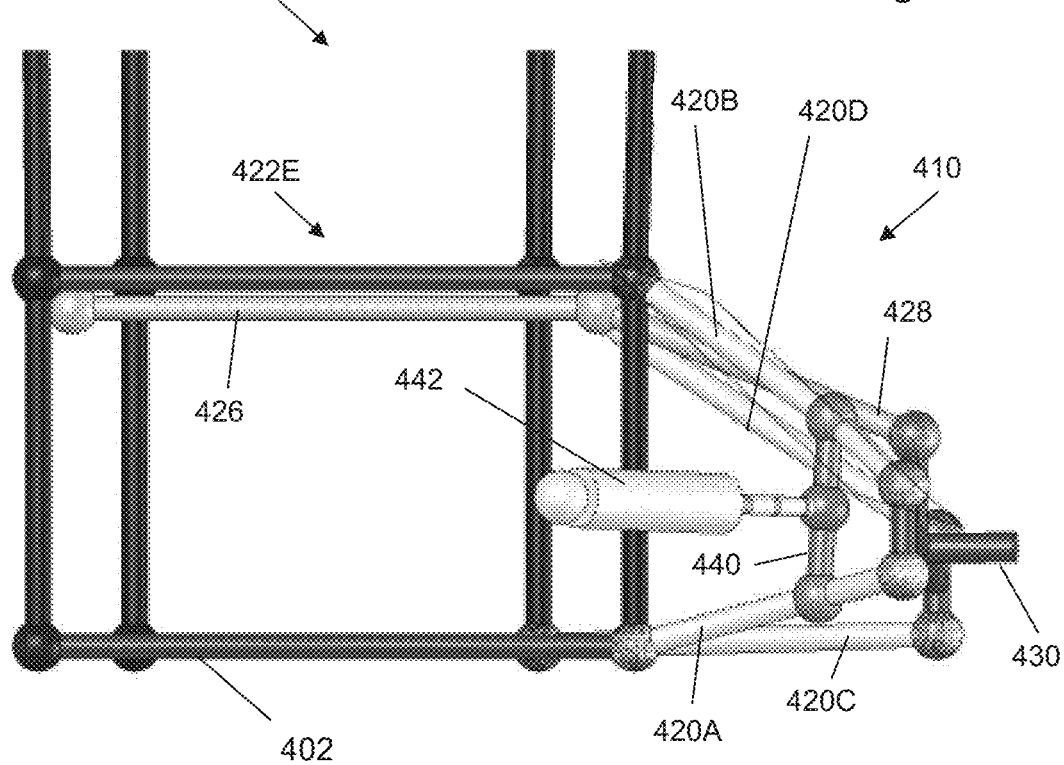
FIGS. 15A-15D illustrate a top view, a side view, a front view, and a perspective view, respectively, of the suspension system shown in FIGS. 14A-14D in a full bump orientation.

FIG. 13E represents the concept of Ackermann on the steered wheels of the vehicle. In Part A of FIG. 13E, when the steered wheels are turned into a corner, the inside wheel turns more into the corner than the outside wheel. In Part B of FIG. 13E, the steered wheels remain parallel, and the inside wheel turns into the corner by the same amount the outside wheel does. In Part C of FIG. 13E, the inside wheel turns into the corner by fewer degrees than the outside wheel, exhibiting Reverse Ackermann. The four-link suspensions depicted throughout each embodiment described herein are capable of being arranged to exhibit one or all types of Ackermann steering, as the situation and design constraints of each vehicle may require. It is also possible that the Ackermann behavior of the vehicle is adjustable in the field by lengthening or shortening threaded rod ends commonly used at the ends of suspension links.

FIGS. 14A-18D discussed below refer to a simplified schematic of another embodiment of a suspension system 410 for a vehicle 400 shown that incorporates the inventive subject matter discussed above termed the rotatably extensible link. In each of FIGS. 14A-18D, a plane is drawn from the three pivot points defining the rear upper link 420B. Through all the different depictions of articulation of the suspension from vertical and steering movement, it is important to note how that plane twists or pivots to enable the rotatably extensible functionality.

Figure 14A:
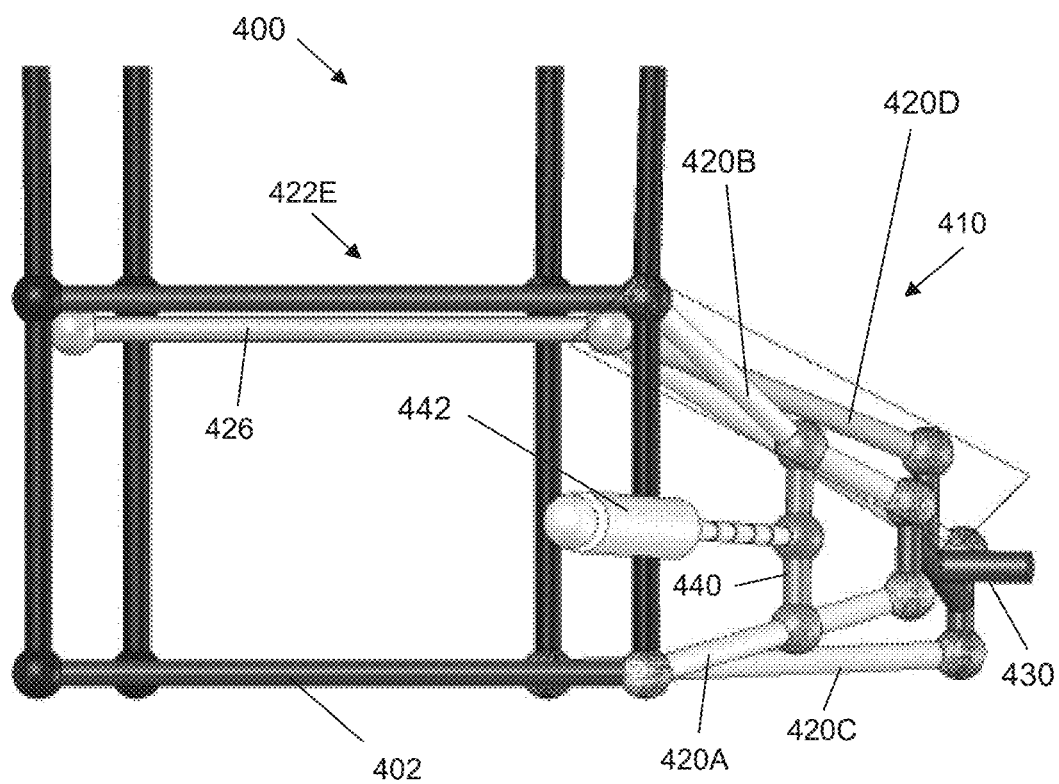
FIGS. 14A-14D illustrate a top view, a side view, a front view, and a perspective view, respectively, of another embodiment of a suspension system for a vehicle in a full droop orientation.
Figure 14B:
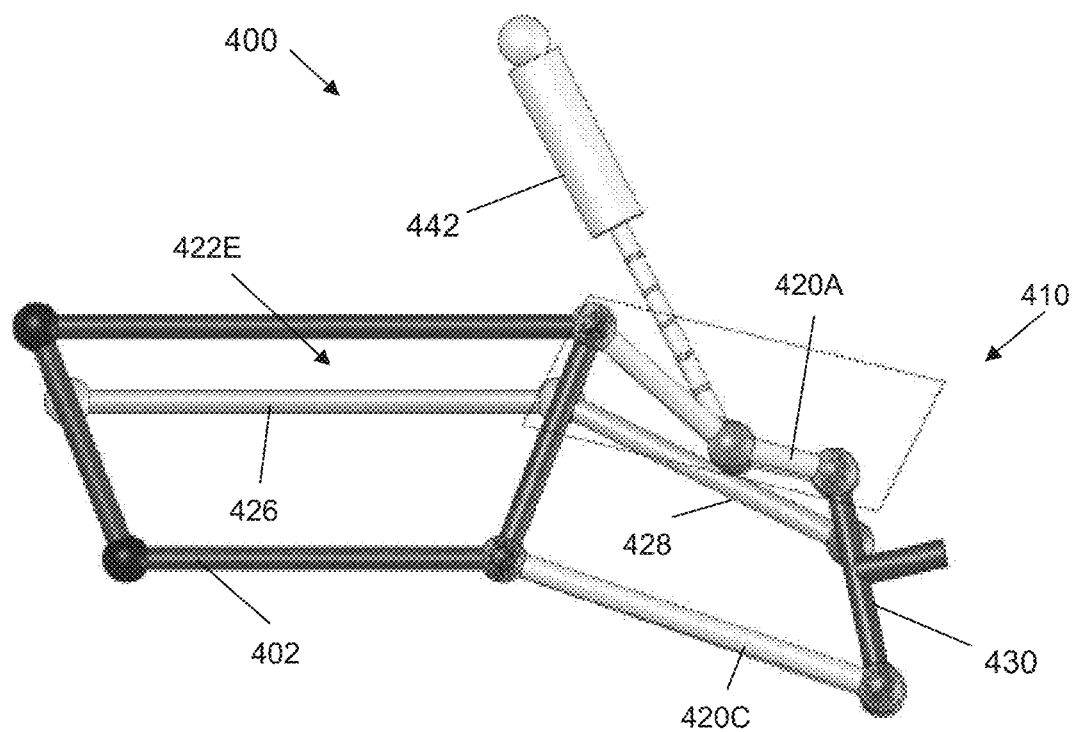

FIGS. 14A-14D illustrate various views of the suspension system 410 in a full droop orientation, where a wheel of the vehicle 400 is in a lowest position relative to the chassis 402 and has moved from a standard position when all of the wheels of the vehicle 400 are on the same horizontal plane. This is best seen in FIG. 14B where the linkages or links 420A-420D are tilted downward relative to the chassis 402 of the vehicle 400.

The suspension system 410 preferably comprises four independent linkages or links 420A-420D each attached to a distinct point on a knuckle or wheel mount 430. Each of the four links 420A-420D are preferably attached at a second end to the chassis 402. Thus, the first link 420A attaches to a first point on an upper portion of the knuckle 430, the second link 420B attaches to a second point on the upper portion of the knuckle 430, the third link 420C attaches to a third point on a lower portion of the knuckle 430, and the fourth link 420D attaches to a fourth point on the lower portion of the knuckle 430. As shown, the first point, second point, third point and fourth point are distinct from one another, unlike the V-type suspension systems of the prior art where two or more linkages connect to the wheel mount at a single point. In a another embodiment (not depicted), it is contemplated that one of links 420A or 420B could have the points where it connects with the knuckle 430, chassis 402 and suspension linkage 440 all lie on a centerline axis, so long as the other of link 420A or 420B does not have those three connection points on the centerline axis. Further, on the link 420A or 420B that had the three connection points off the centerline axis, that link should have roughly twice the off axis distance to allow for the rotatably extensible behavior to all be accomplished on one side of the pair of links 420A and 420B.

As can be seen from the Figures, the first link 420A and third link 420C connect a front portion of the knuckle 430 to the chassis 402 of the vehicle 400, while the second link 420B and fourth link 420D connects a rear portion of the knuckle 430 to the chassis 402. By independently attaching each of the links 420A-420D to the knuckle 430, this advantageously permits the links 420A-420D to move and pivot independently of one another.

Each of the links 420A-420D preferably comprises a load-bearing arm to allow forces encountered by the knuckle 430 and wheel to be distributed among the links 420A-420D.

Preferably, each of the four independent links 420A-420D attach to the knuckle 430 via a spherical ball joint. In such embodiments, each link can be secured to the ball joint using one or more bolts or other commercially suitable fasteners. It is especially preferred that some or all of the links are secured to their respective ball joint via two fasteners, where each fastener is disposed on an opposing side of the ball joint.

Also depicted is a front corner with a steering linkage or link 422E comprising a steering system 426 disposed within the chassis 402. It is contemplated that a tie-rod 428 can be attached to the steering system 420E on one end and the steering pivot location on the other end.

As shown in the Figures, a sixth linkage or link 440 is preferably disposed between two of the four independent linkages or links 420A-420D. Here, the sixth linkage or link (spring and damper link) 440 is disposed mounted as a cross-link in a plane below and between the upper two links 420A, 420B; however, in alternative embodiments, it is contemplated that the sixth link 440 could be disposed between the lower two links 420C, 420D. A spring damper assembly 442 (shock assembly) is attached to the sixth link 440.

The sixth link 440 is preferably a rotatably extensible link, such that the sixth link 440 and the two connected links 420A, 420B can rotate with respect to one another. Thus, the sixth link 440 is able to accommodate for the motion of the suspension system 410 including both steering motion (change in position of the steering link 420E) and the change in position of the links 420A-420D as the vehicle 400 travels over bumps and undulations of the road or other surface.

In this manner, the sixth link 440 advantageously comprises the benefits of a telescoping member such as described below but can be made entirely using sealed bearings that can withstand a harsh environment significantly better than a sliding or telescoping member could. For example, as described above with respect to FIGS. 1-7, the sixth link 440 can be preferably disposed in an aperture of a gusset, where the aperture is surrounded by a set of ball bearings (such as shown in FIG. 6).

The rotatably extensible link 440 is shown in FIGS. 14A-14D by illustrating a plane created by the three points of the upper, rear link 120B, and showing how this plane rotates during suspension travel (compare FIG. 14A with FIGS. 14B-14D) to accommodate the change in distance between the two connected links 420A, 420B to prevent binding of the sixth link 440. This plane must also rotate to allow for steering motion, as the four independent links 420A-420D sweep out a changing kingpin axis and wheelbase as the suspension system 410 is steered.

Figure 15B:
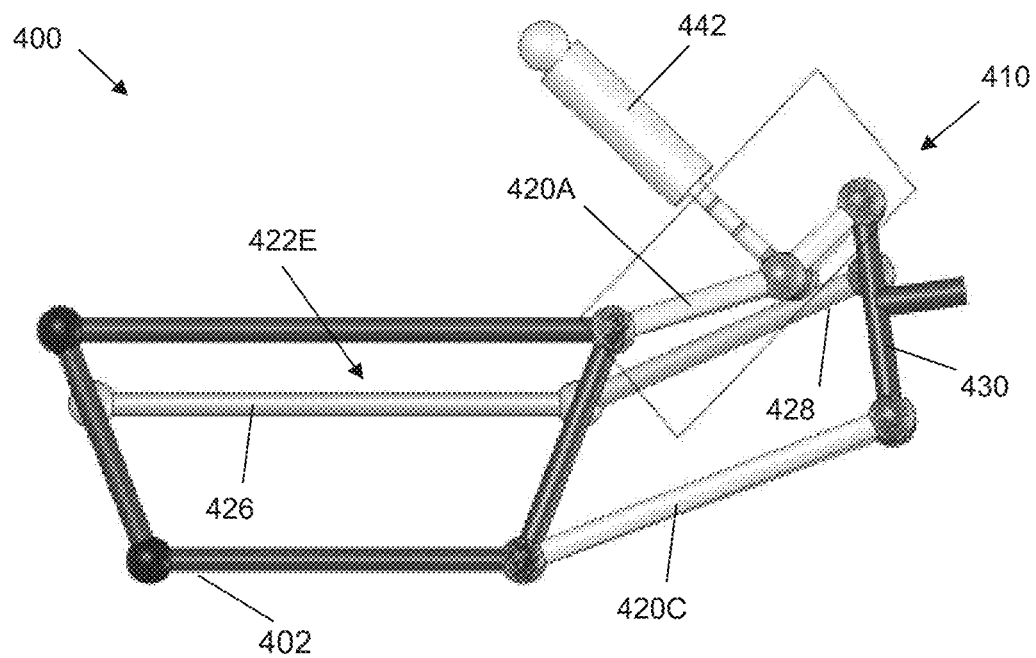
Figure 14C:
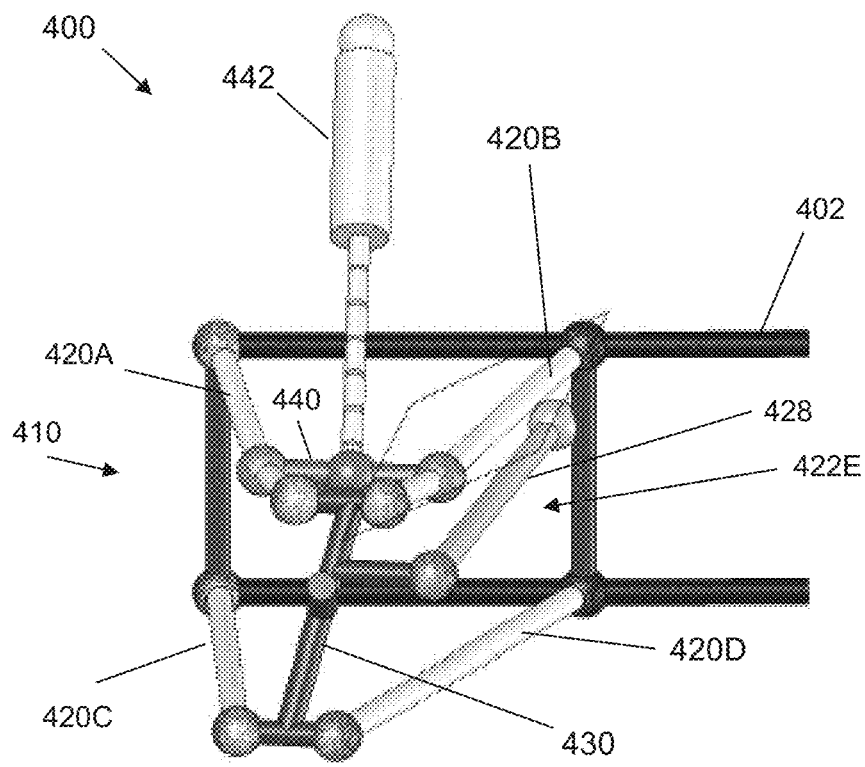
Figure 15C:
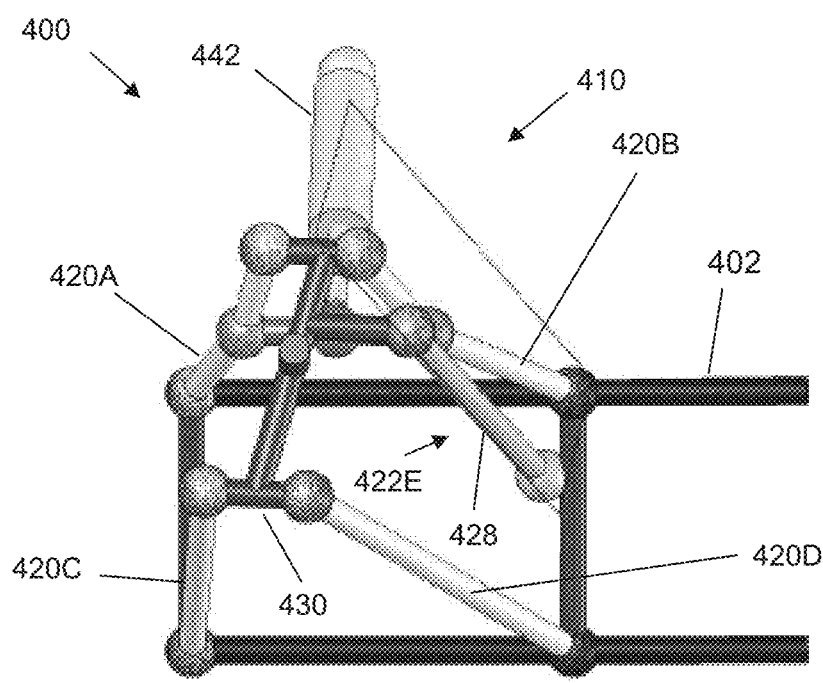
Figure 14D:
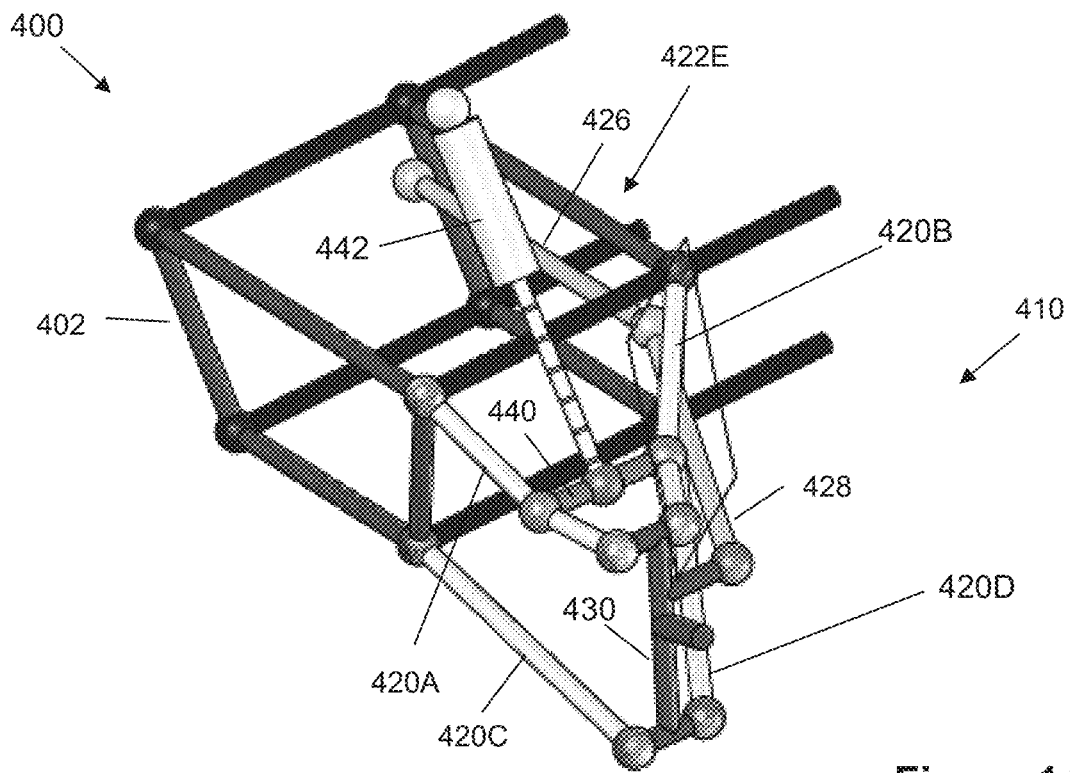
Figure 15D:
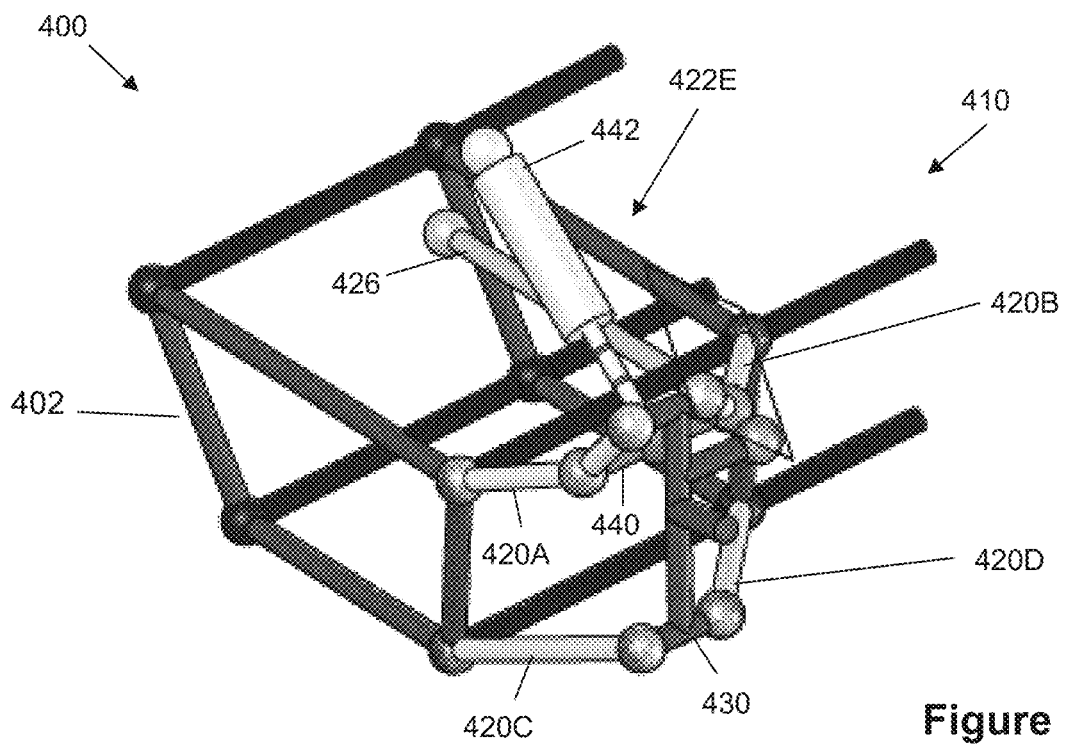
Figure 16A:
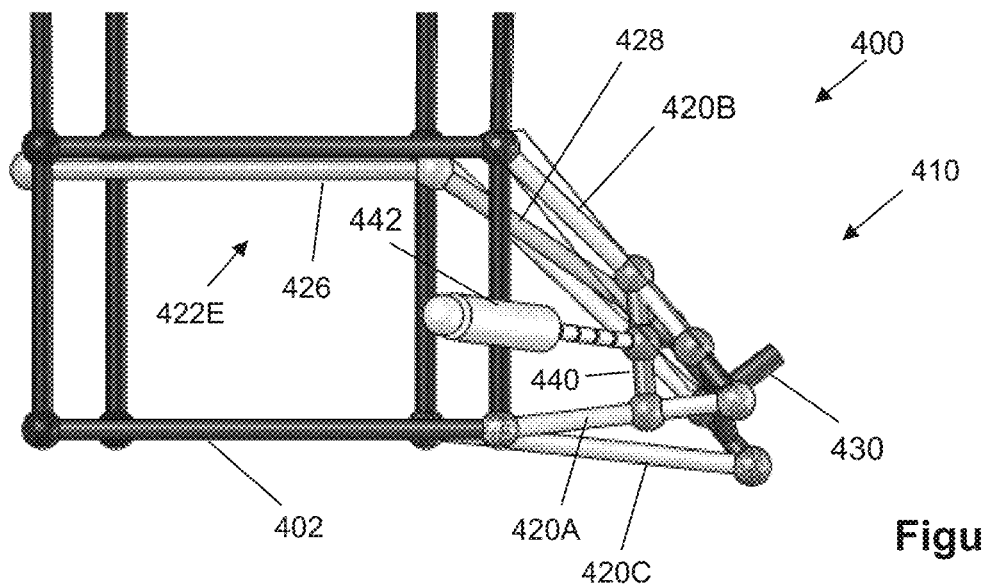
FIGS. 16A-16D illustrate a top view, a side view, a front view, and a perspective view, respectively, of the suspension system shown in FIGS. 14A-14D in a mid-range, left-steering orientation.
Figure 17A:
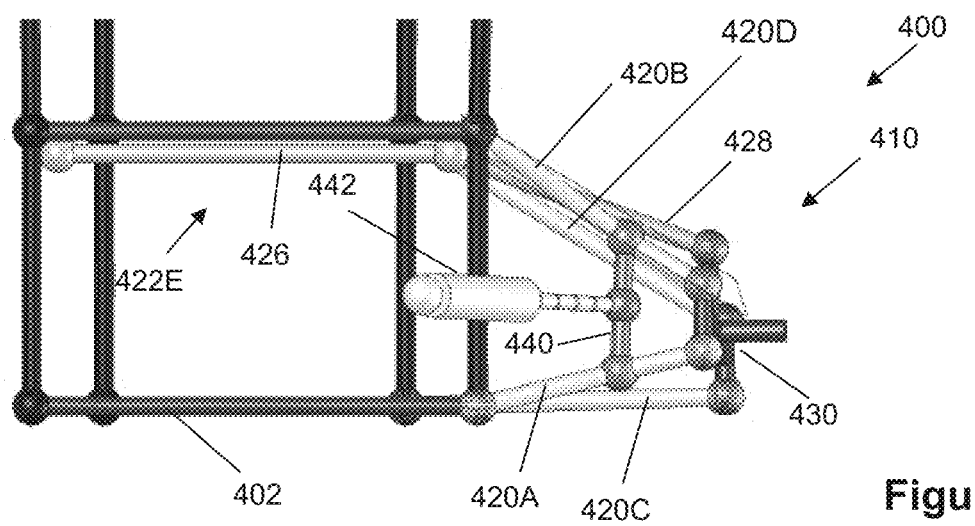
FIGS. 17A-17D illustrate a top view, a side view, a front view, and a perspective view, respectively, of the suspension system shown in FIGS. 14A-14D in a mid-range, straight-ahead orientation.
Figure 18A:
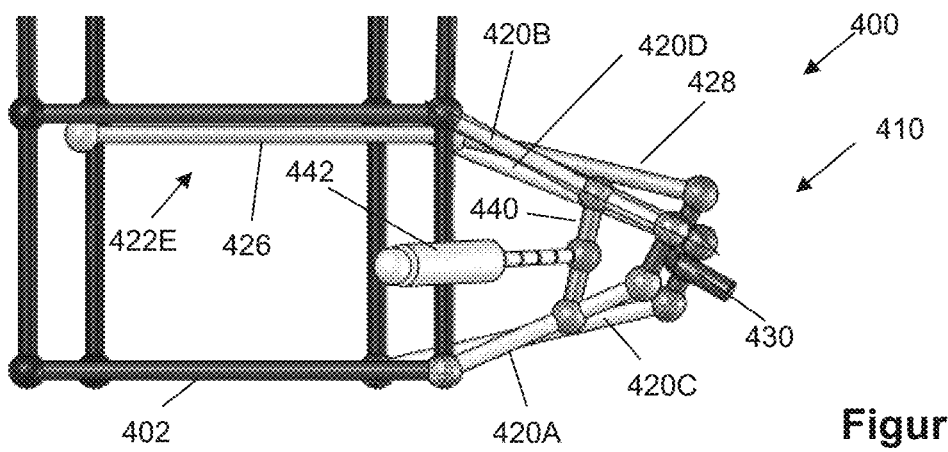
FIGS. 18A-18D illustrate a top view, a side view, a front view, and a perspective view, respectively, of the suspension system shown in FIGS. 14A-14D in a mid-range, right-steering orientation.
Figure 16B:
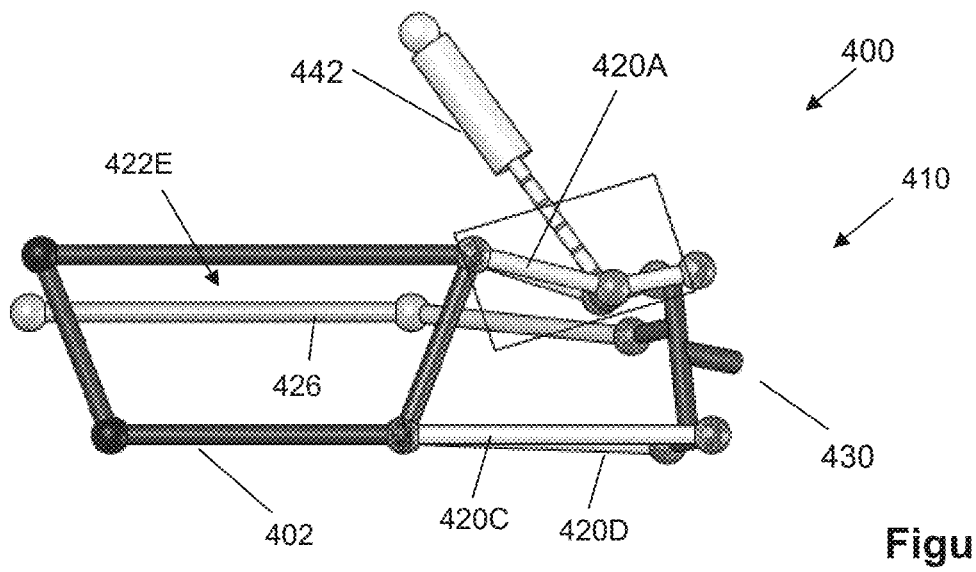
Figure 17B:
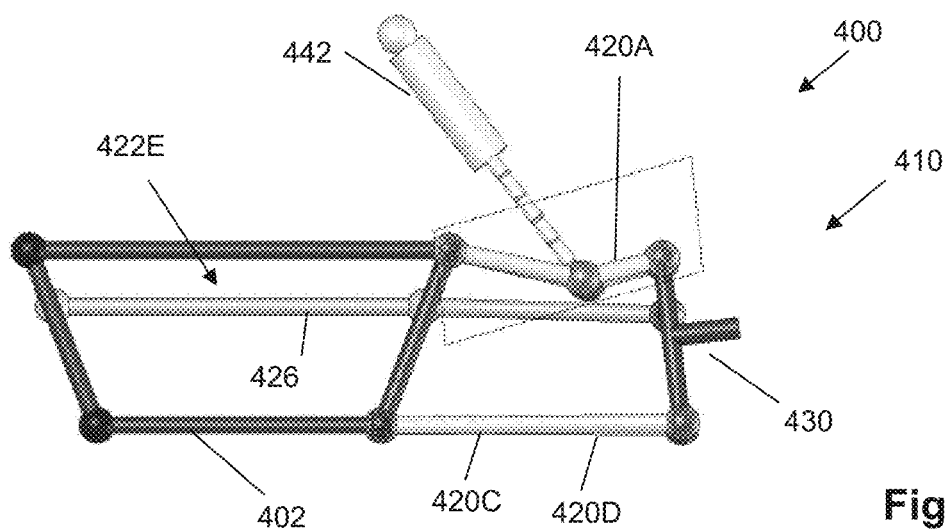
Figure 18B:
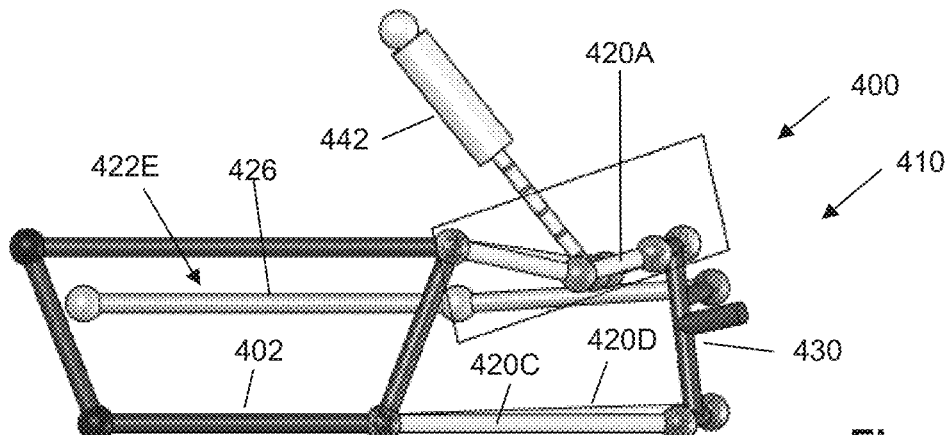
Figure 16C:
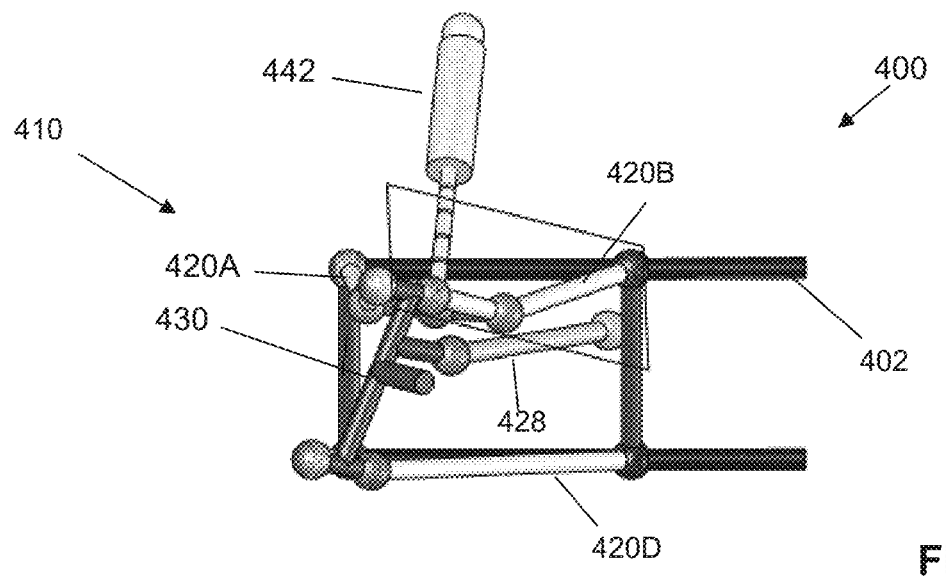
Figure 17C:
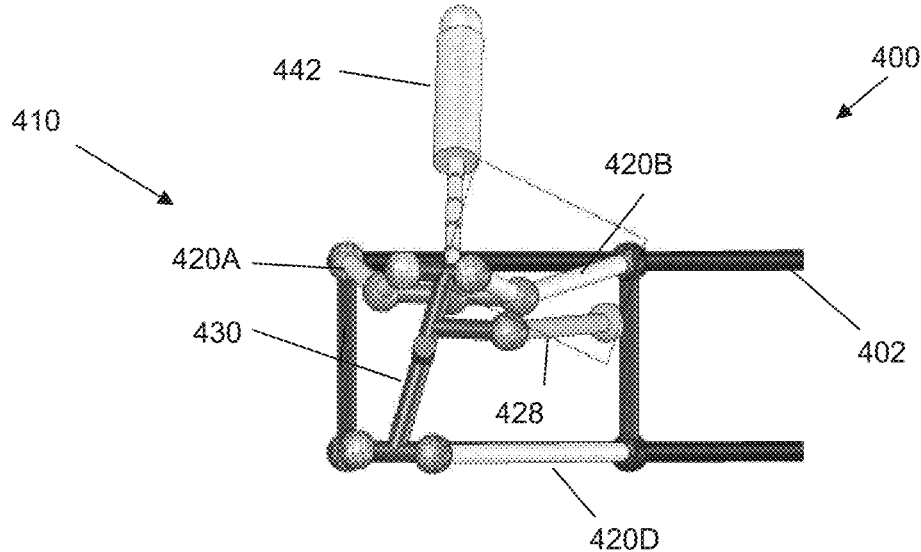
Figure 18C:
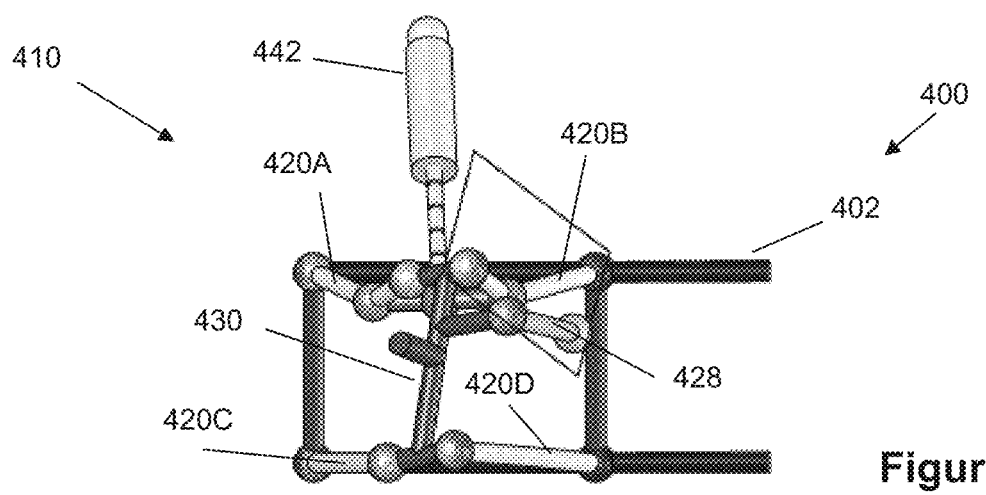
Figure 16D:
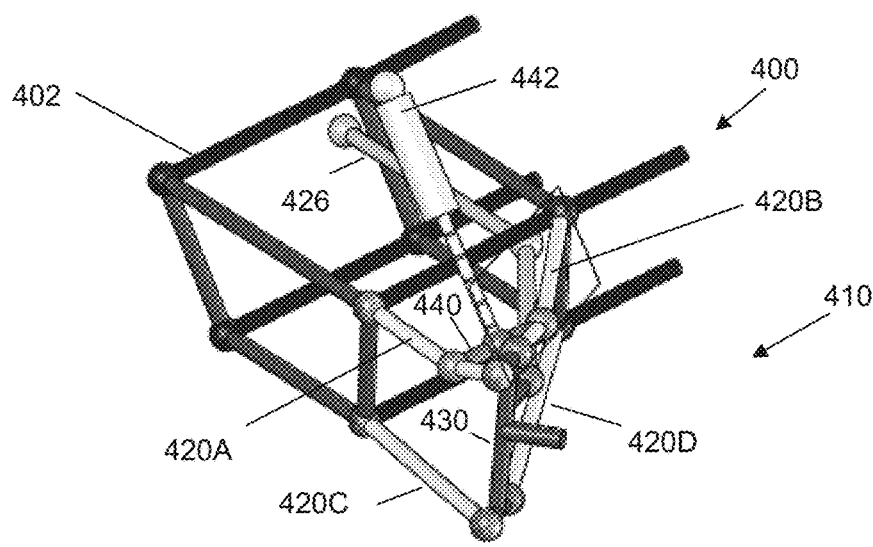
Figure 17D:
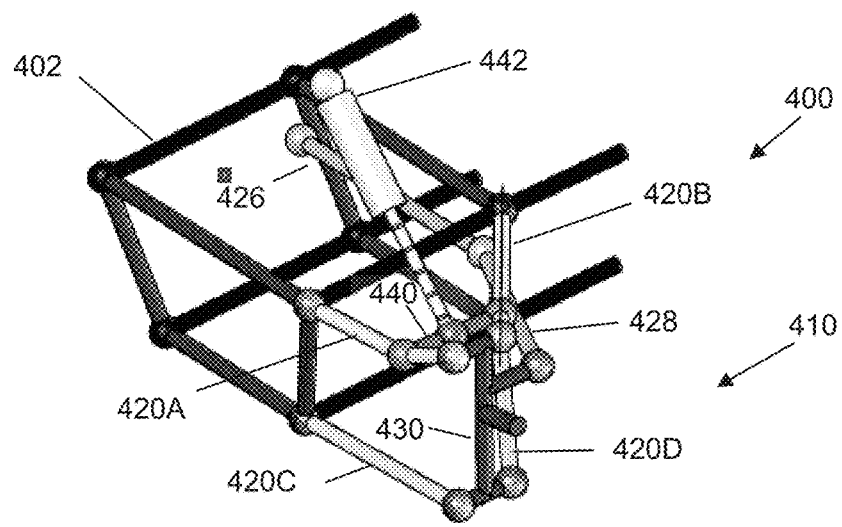
Figure 18D:
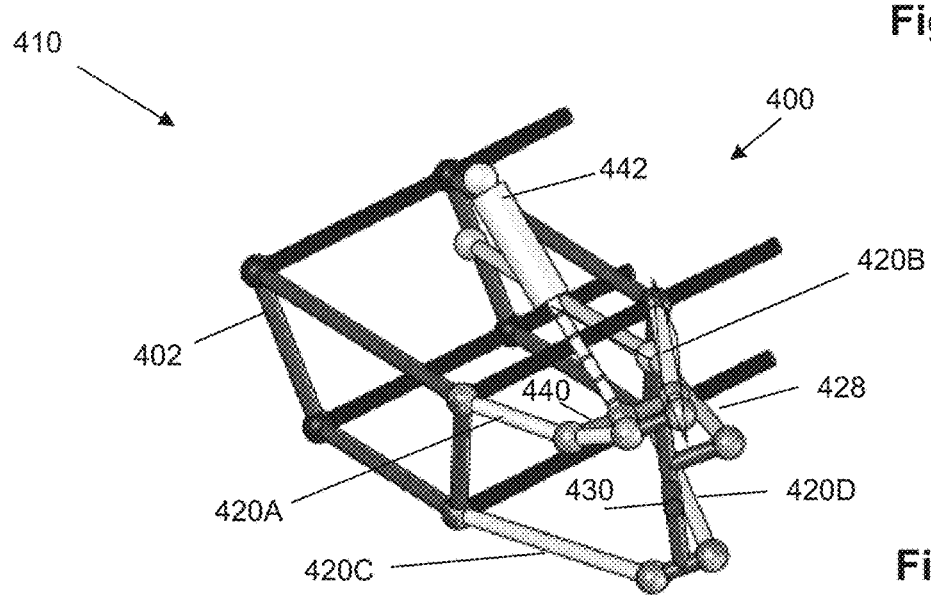
Figure 20A:
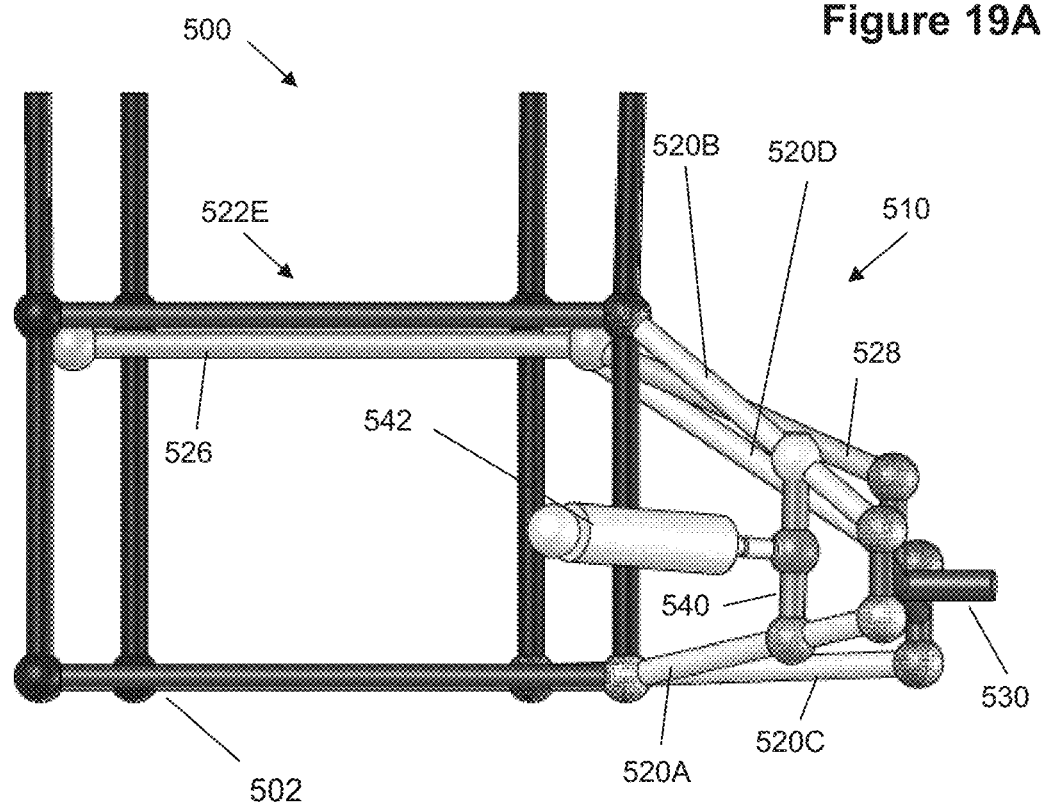
FIGS. 20A-20D illustrate a top view, a side view, a front view, and a perspective view, respectively, of the suspension system shown in FIGS. 19A-19D in a full bump orientation.

FIGS. 15A-15D illustrate various views of the suspension system 410 in a full bull orientation, where a wheel of the vehicle 400 is in a highest position relative to the chassis 402 and has moved from a standard position when all of the wheels of the vehicle 400 are on the same horizontal plane. This is best seen in FIG. 15B where the linkages or links 420A-420D are tilted upward relative to the chassis 402 of the vehicle 400. With respect to the remaining numerals in each of FIGS. 15A-15D, the same considerations for like components with like numerals of FIGS. 14A-14D apply.

FIGS. 16A-16D, FIGS. 17A-17D and FIGS. 18A-18D illustrate various views of the suspension system 410 in a mid-range orientation. Specifically, FIGS. 16A-16D illustrate a top view, a side view, a front view, and a perspective view, respectively, of the suspension system 410 in a left-steering orientation. FIGS. 17A-17D illustrate a top view, a side view, a front view, and a perspective view, respectively, of the suspension system 410 in a straight-ahead orientation. FIGS. 18A-18D illustrate a top view, a side view, a front view, and a perspective view, respectively, of the suspension system 410 in a right-steering orientation.

With respect to the remaining numerals in each of FIGS. 16A-18D, the same considerations for like components with like numerals of FIGS. 14A-14D apply.

FIGS. 19A-23D discussed below refer to a simplified schematic of another embodiment of a suspension system 510 for a vehicle 500 shown that incorporates the inventive subject matter discussed herein, which has previously been referred to as incorporating a telescoping spring and damper link.

Figure 19A:
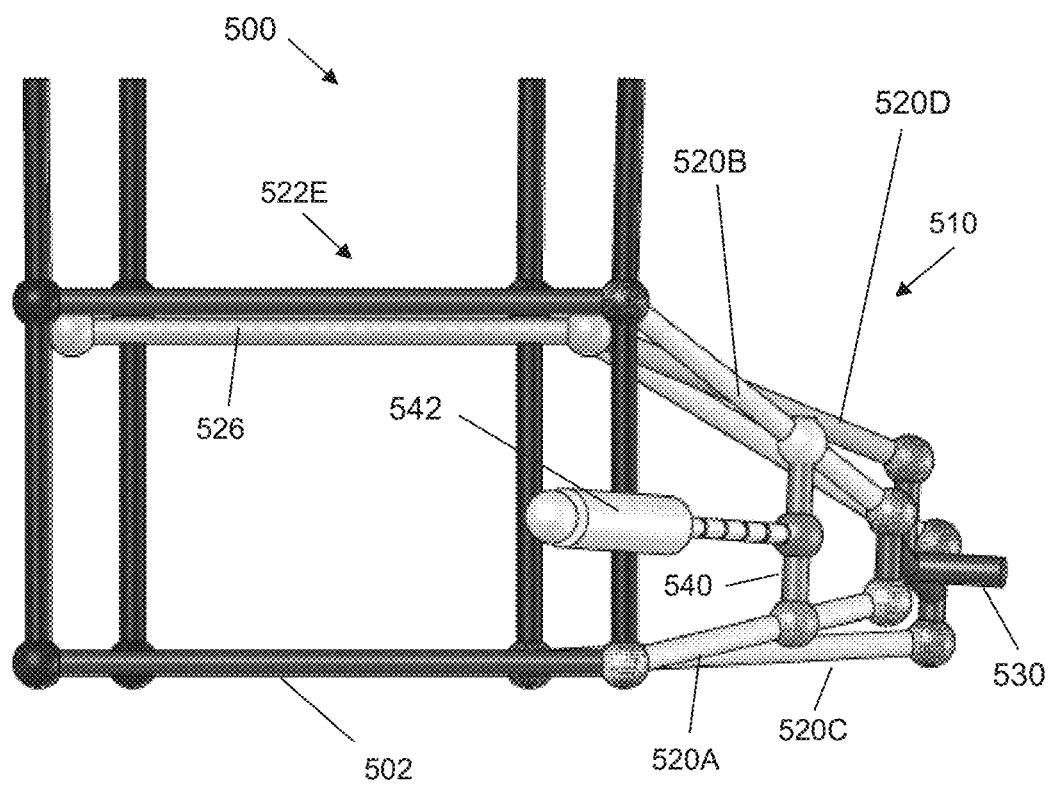
FIGS. 19A-19D illustrate a top view, a side view, a front view, and a perspective view, respectively, of another embodiment of a suspension system for a vehicle in a full droop orientation.
Figure 19B:
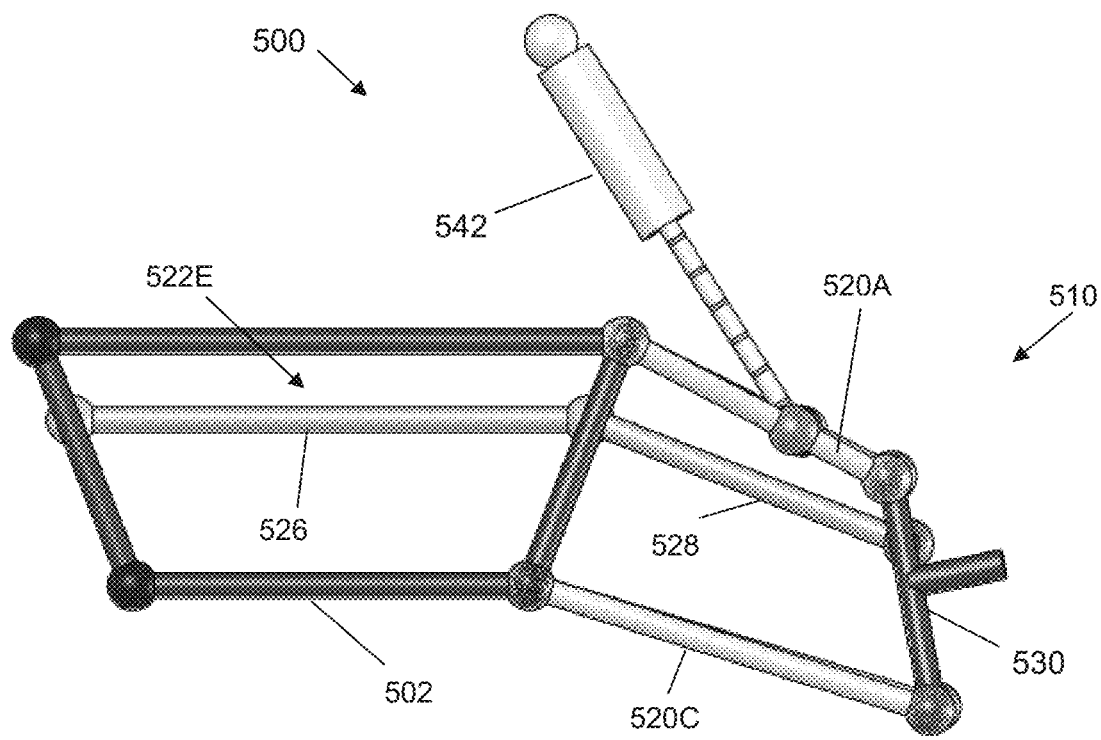

FIGS. 19A-19D illustrate various views of the suspension system 510 in a full droop orientation, where a wheel of the vehicle 500 is in a lowest position relative to the chassis 502 and has moved from a standard position when all of the wheels of the vehicle 500 are on the same horizontal plane. This is best seen in FIG. 19B where the linkages or links 520A-520D are tilted downward relative to the chassis 502 of the vehicle 500.

The suspension system 510 preferably comprises four independent linkages or links 520A-520D each attached to a distinct point on a knuckle or wheel mount 530. Each of the four links 520A-520D are preferably attached at a second end to the chassis 502. Thus, the first link 520A attaches to a first point on an upper portion of the knuckle 530, the second link 520B attaches to a second point on the upper portion of the knuckle 530, the third link 520C attaches to a third point on a lower portion of the knuckle 530, and the fourth link 520D attaches to a fourth point on the lower portion of the knuckle 530. As shown, the first point, second point, third point and fourth point are distinct from one another, unlike the V-type suspension systems of the prior art where two or more linkages connect to the wheel mount at a single point.

As can be seen from the Figures, the first link 520A and third link 520C connect a front portion of the knuckle 530 to the chassis 502 of the vehicle 500, while the second link 520B and fourth link 520D connects a rear portion of the knuckle 530 to the chassis 502. By independently attaching each of the links 520A-520D to the knuckle 530, this advantageously permits the links 520A-520D to move and pivot independently of one another.

Each of the links 520A-520D preferably comprises a load-bearing arm to allow forces encountered by the knuckle 530 and wheel to be distributed among the links 520A-520D.

Preferably, each of the four independent links 520A-520D attach to the knuckle 530 via a spherical ball joint. In such embodiments, each link can be secured to the ball joint using one or more bolts or other commercially suitable fasteners. It is especially preferred that some or all of the links are secured to their respective ball joint via two fasteners, where each fastener is disposed on an opposing side of the ball joint.

Also depicted is a front corner with a steering linkage or link 422E comprising a steering system 526 disposed within the chassis 502. It is contemplated that a tie-rod 528 can be attached to the steering system 520E on one end and the steering pivot location on the other end.

As shown in the Figures, a sixth linkage or link 540 is preferably disposed between two of the four independent linkages or links 520A-520D. Here, the sixth linkage or link 540 is disposed mounted as a cross-link in a plane below and between the upper two links 520A, 520B; however, in alternative embodiments, it is contemplated that the sixth link 540 could be disposed between the lower two links 520C, 520D. A spring damper assembly 542 (shock assembly) is attached to the sixth link 540.

The sixth link 540 is preferably an extensible link, such that the sixth link 540 is able to accommodate movement of the two connected links 520A, 520B. Thus, the sixth link 540 is able to accommodate for the motion of the suspension system 510 including both steering motion and the change in position of the links 520A-520D as the vehicle 500 travels over bumps and undulations of the road or other surface.

By mounting the spring damper assembly 542 on the sixth link 540, the sixth link 540 can advantageously distribute forces absorbed by the spring damper assembly 542 through the two connected links (here, links 520A, 520B) for strength, while not interrupting the balanced state between negative and positive pressure among the links 520A-520D, which is required in order to eliminate the feedback to the steering wheel.

Figure 20B:
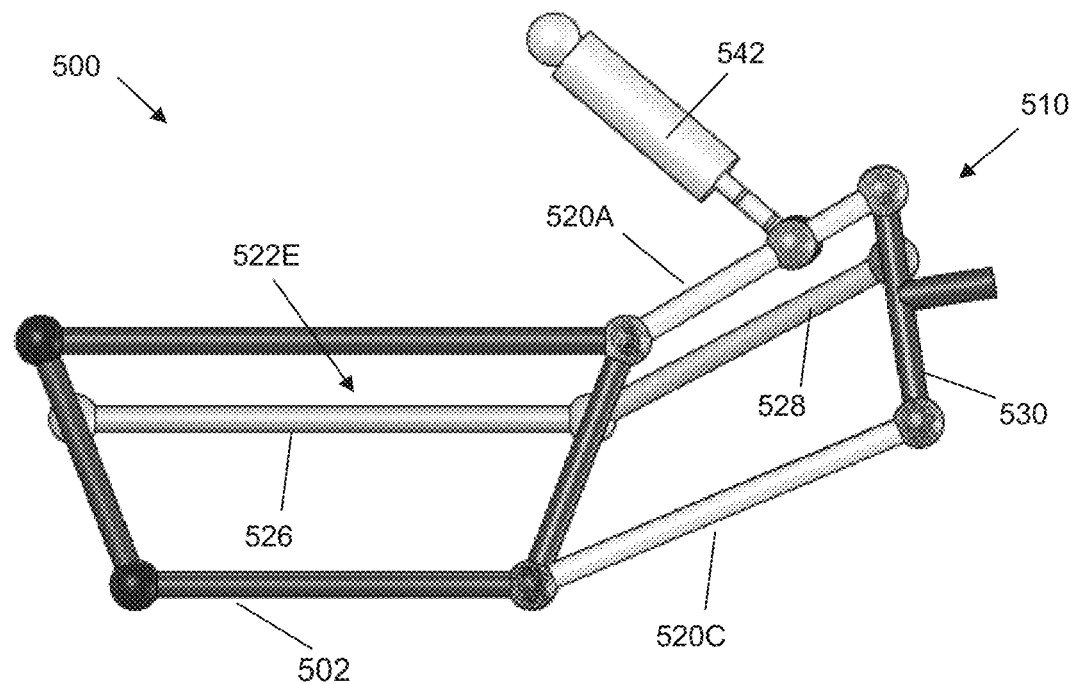
Figure 19C:
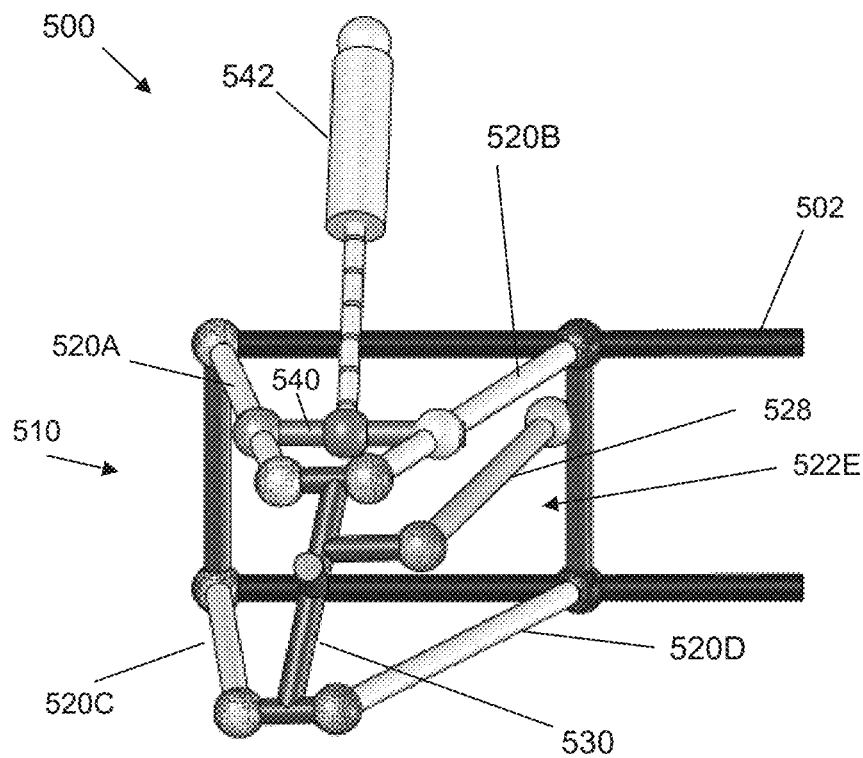
Figure 20C:
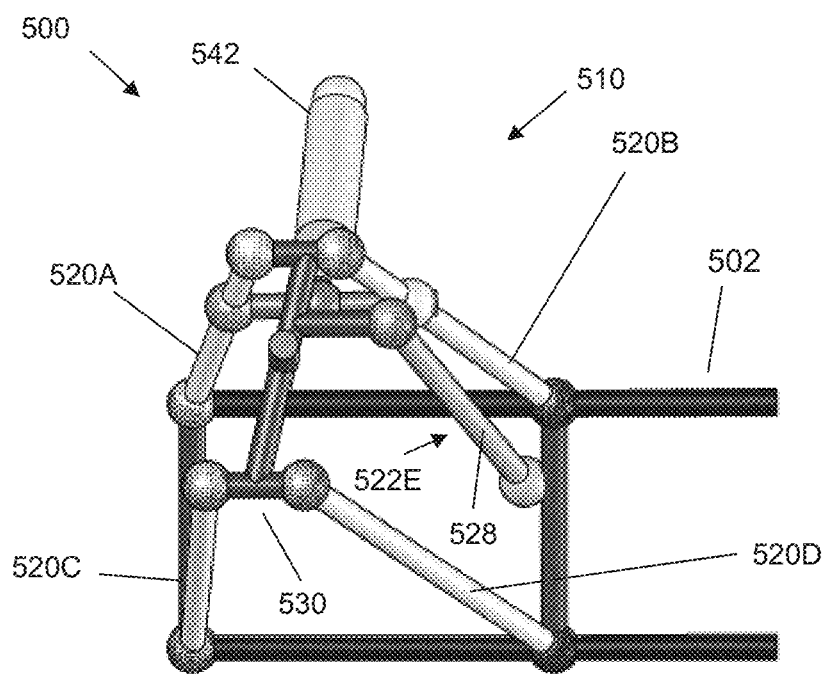
Figure 19D:
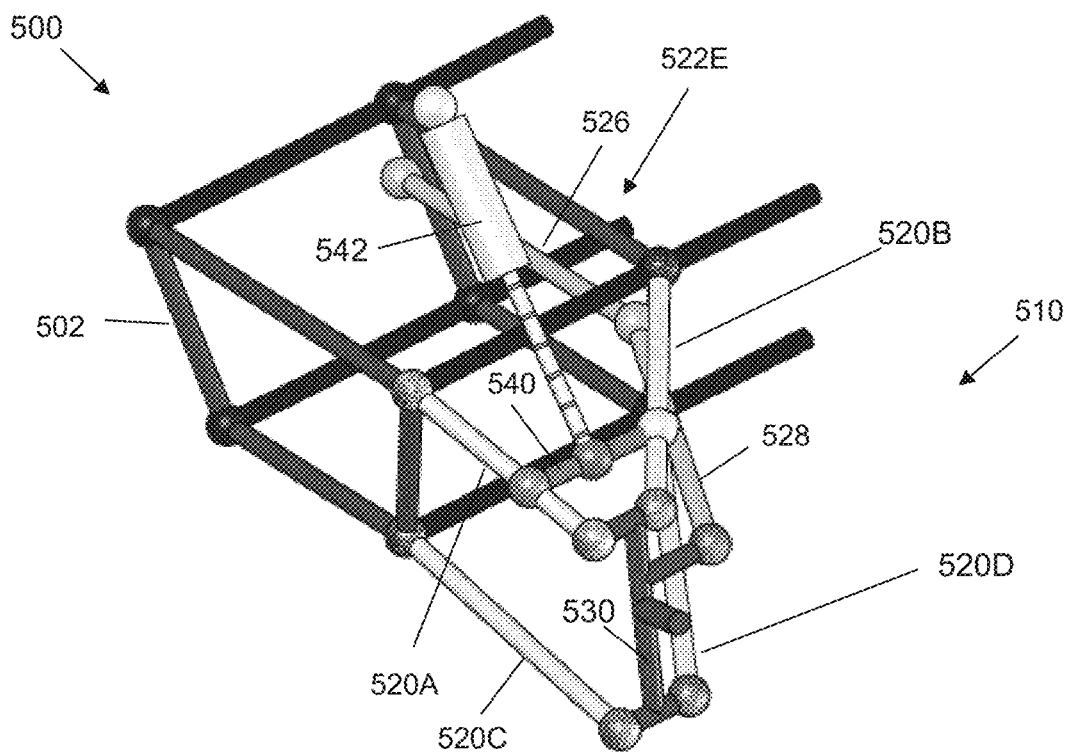
Figure 20D:
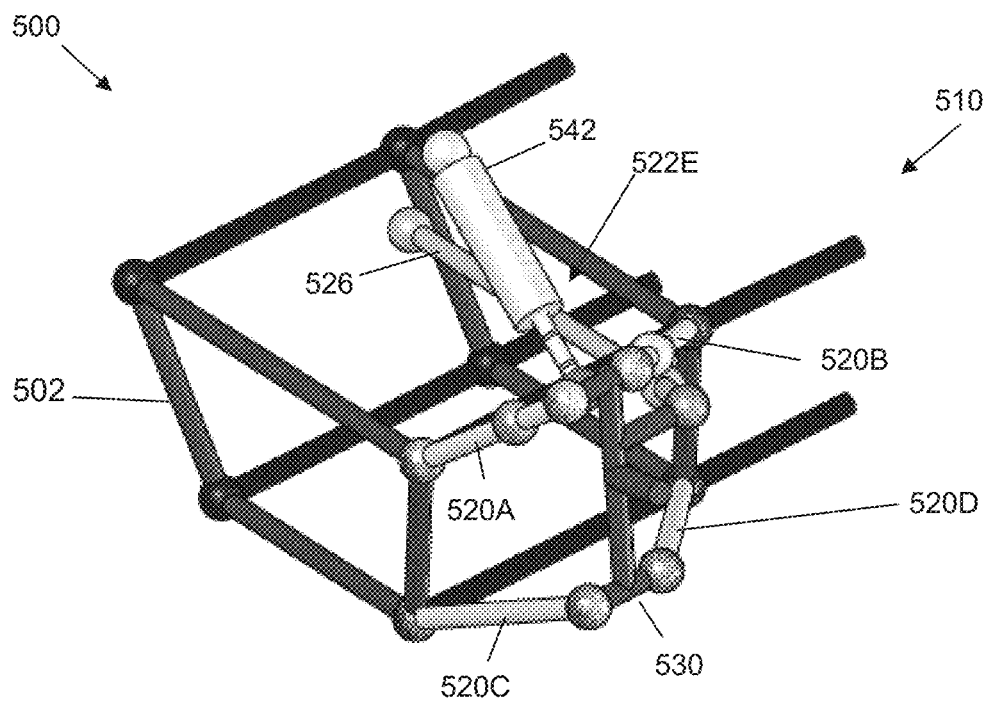
Figure 21A:
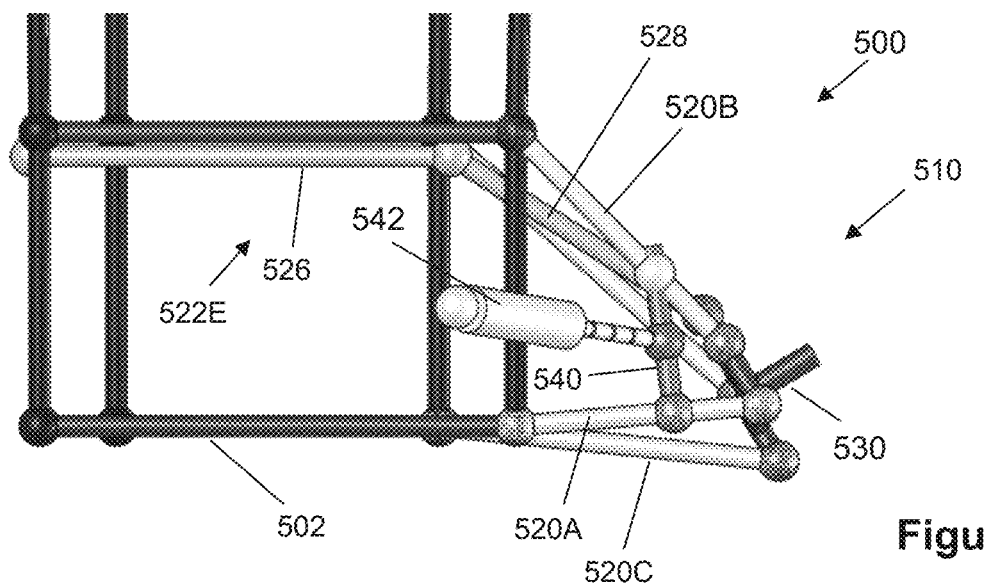
FIGS. 21A-21D illustrate a top view, a side view, a front view, and a perspective view, respectively, of the suspension system shown in FIGS. 19A-19D in a mid-range, left-steering orientation.
Figure 22A:
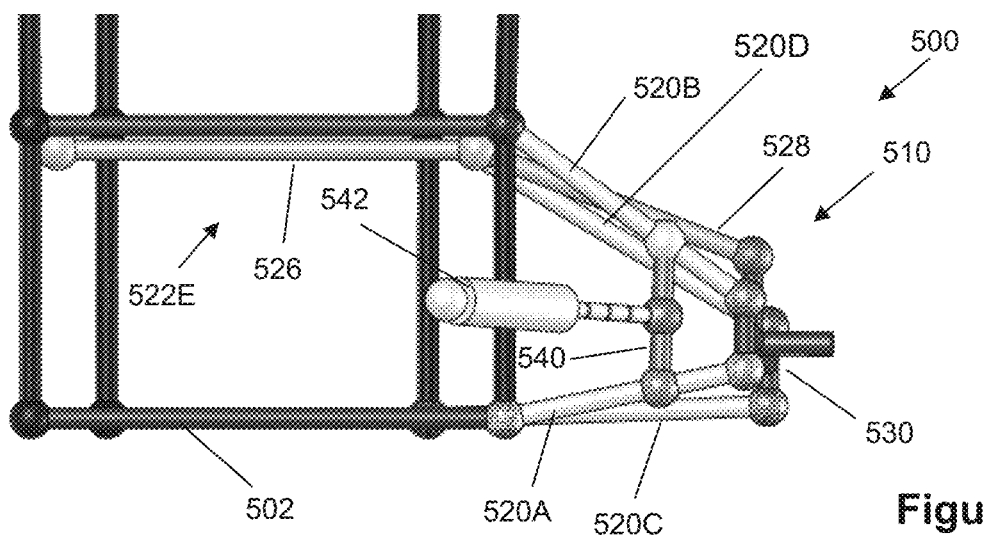
FIGS. 22A-22D illustrate a top view, a side view, a front view, and a perspective view, respectively, of the suspension system shown in FIGS. 19A-19D in a mid-range, straight-ahead orientation.
Figure 23A:
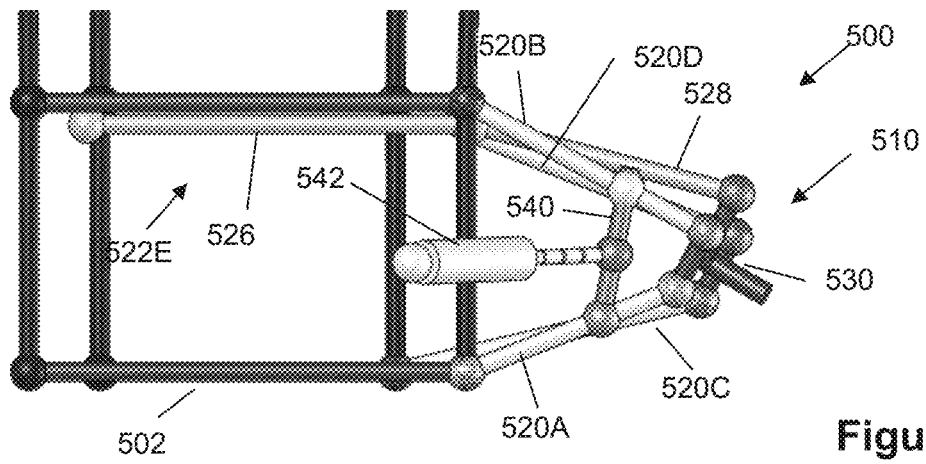
FIGS. 23A-23D illustrate a top view, a side view, a front view, and a perspective view, respectively, of the suspension system shown in FIGS. 19A-19D in a mid-range, right-steering orientation.
Figure 21B:
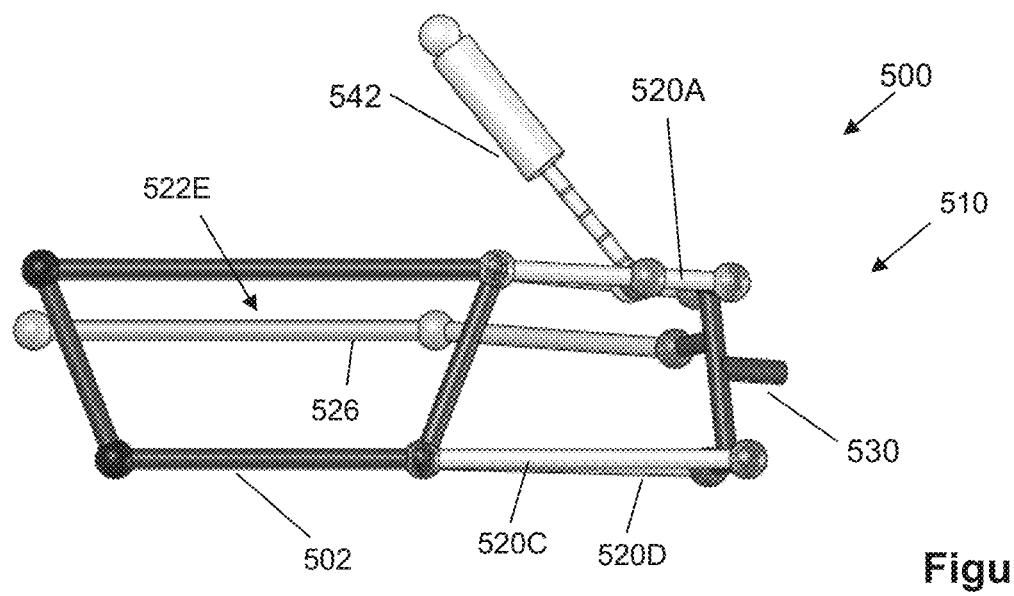
Figure 22B:
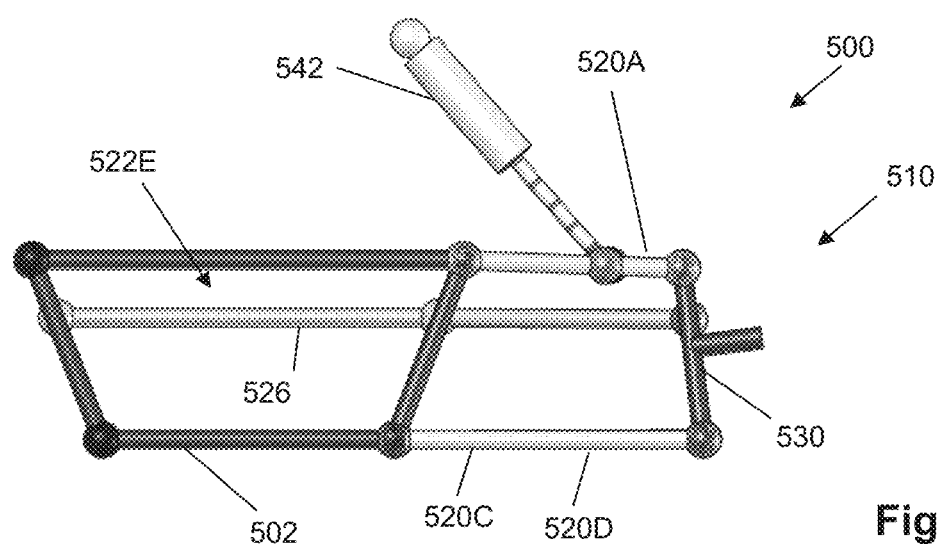
Figure 23B:
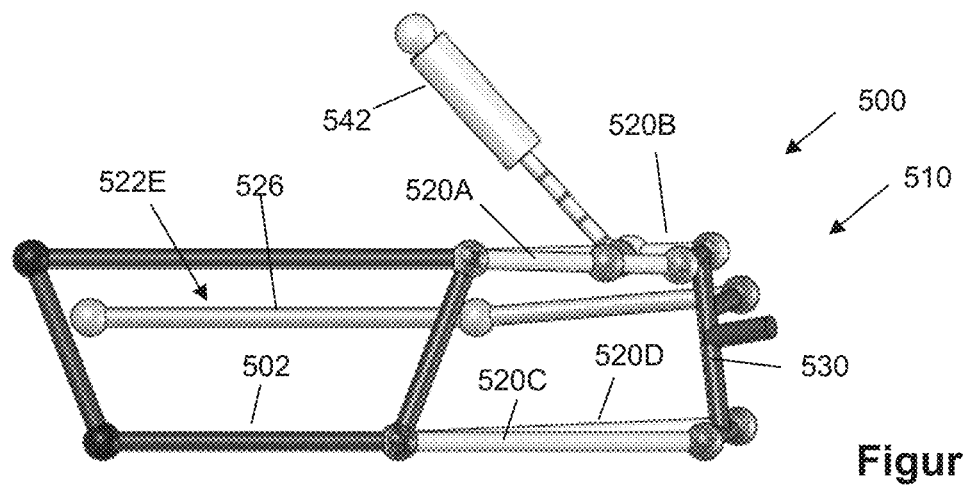
Figure 21C:
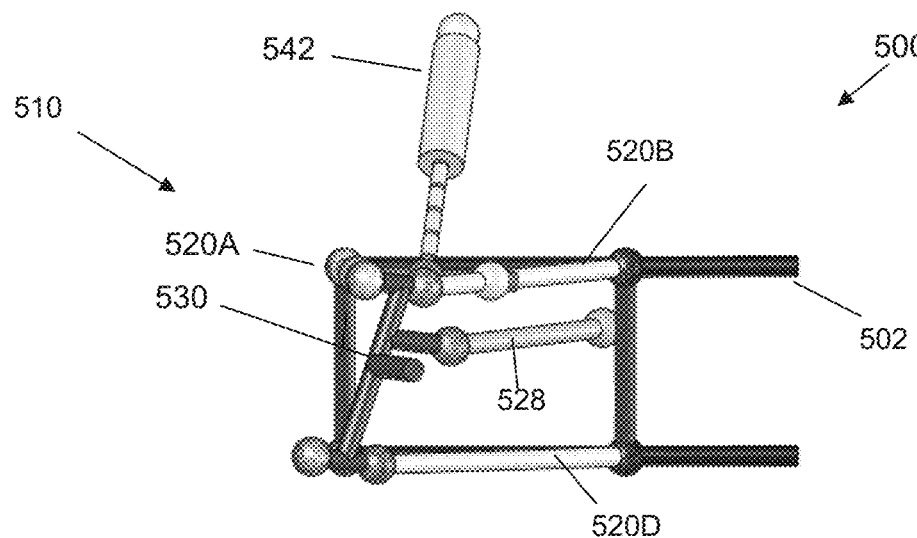
Figure 22C:
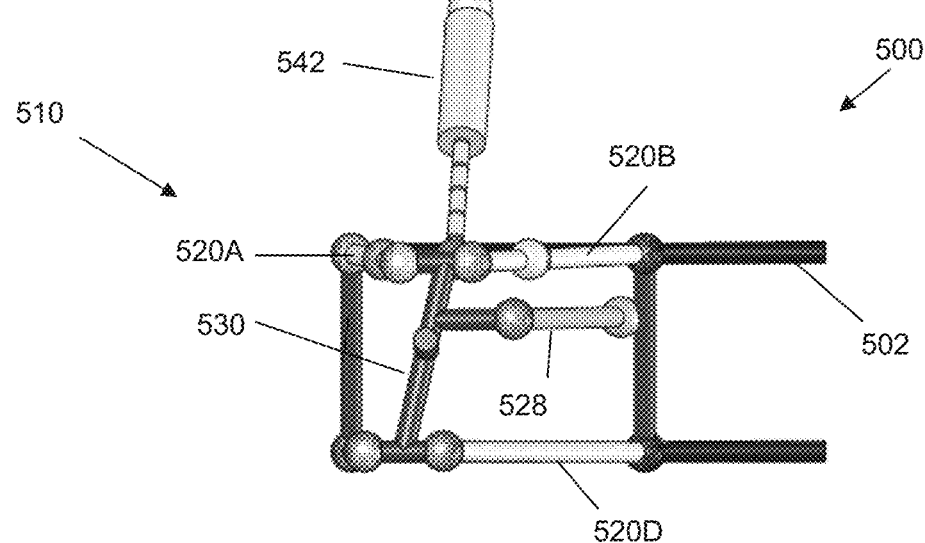
Figure 23C:
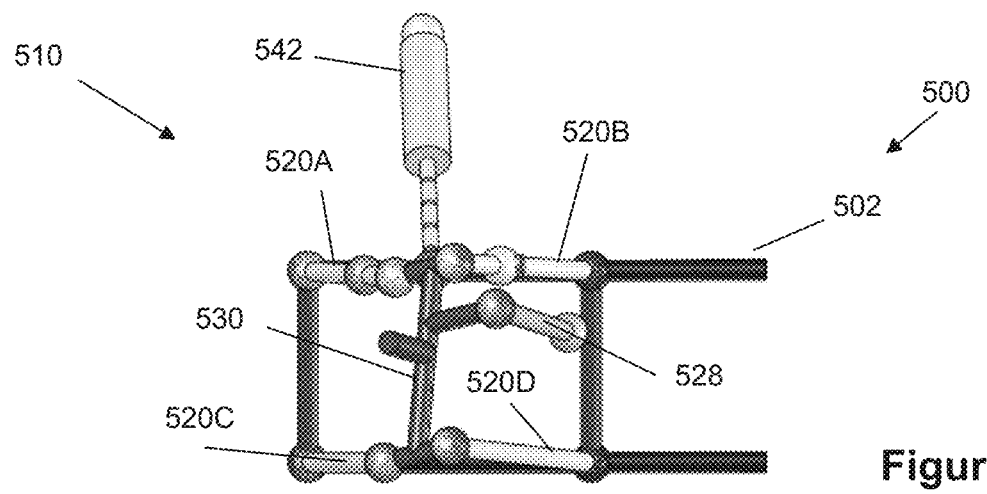
Figure 21D:
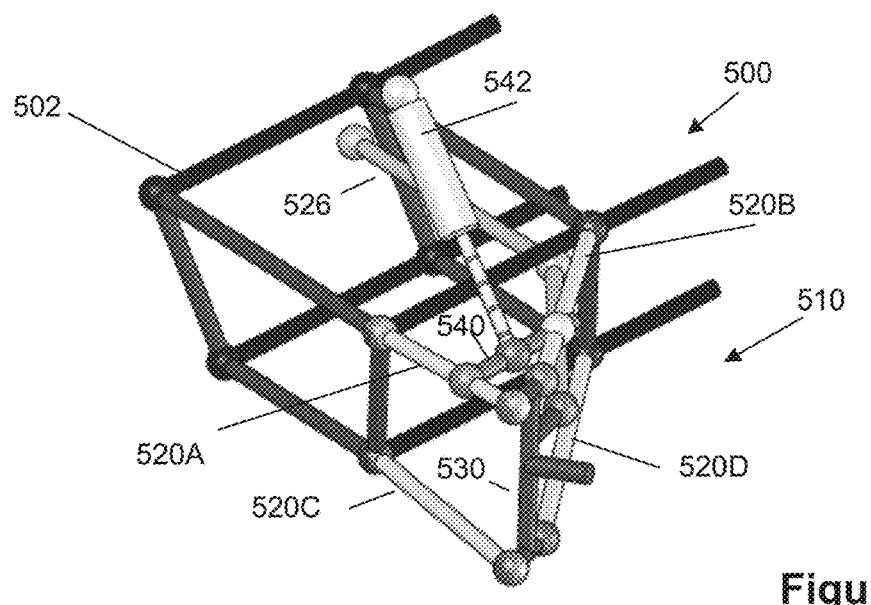
Figure 22D:
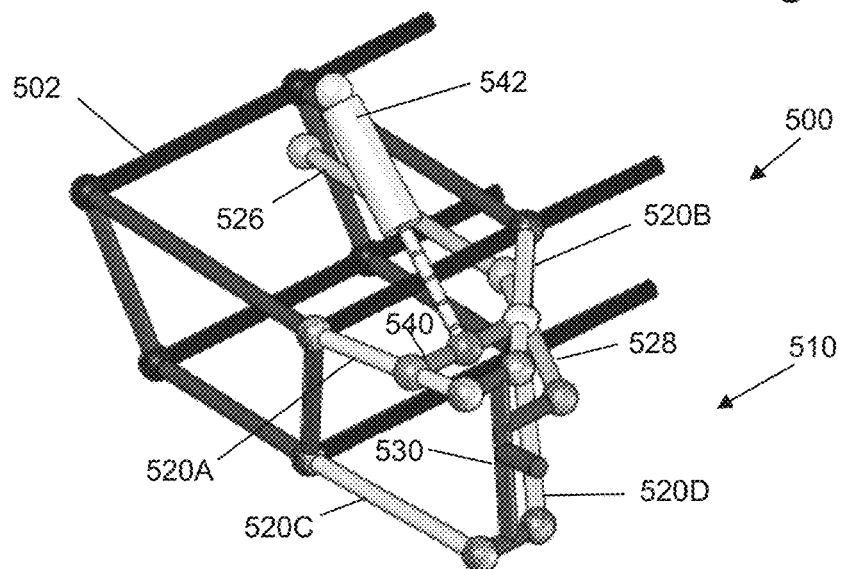
Figure 23D:
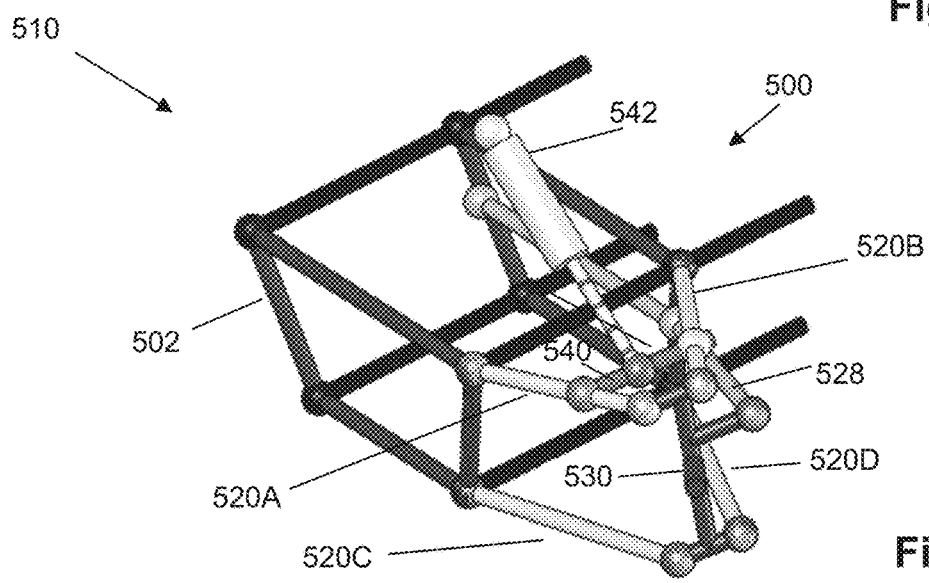

FIGS. 20A-20D illustrate various views of the suspension system 510 in a full bump orientation, where a wheel of the vehicle 500 is in a highest position relative to the chassis 502 and has moved from a standard position when all of the wheels of the vehicle 500 are on the same horizontal plane. This is best seen in FIG. 20B where the linkages or links 520A-520D are tilted upward relative to the chassis 502 of the vehicle 500. With respect to the remaining numerals in each of FIGS. 20A-20D, the same considerations for like components with like numerals of FIGS. 19A-19D apply.

FIGS. 21A-21D, FIGS. 22A-22D and FIGS. 23A-23D illustrate various views of the suspension system 510 in a mid-range orientation. Specifically, FIGS. 21A-21D illustrate a top view, a side view, a front view, and a perspective view, respectively, of the suspension system 510 in a left-steering orientation. FIGS. 22A-22D illustrate a top view, a side view, a front view, and a perspective view, respectively, of the suspension system 510 in a straight-ahead orientation. FIGS. 23A-23D illustrate a top view, a side view, a front view, and a perspective view, respectively, of the suspension system 510 in a right-steering orientation.

With respect to the remaining numerals in each of FIGS. 21A-23D, the same considerations for like components with like numerals of FIGS. 19A-19D apply.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A suspension system for at least one corner of a vehicle having a chassis or multiple subframes, comprising:
   a knuckle assembly carrying at least a wheel and bearing assembly for contacting the ground at an edge of the vehicle;
   a first link that connects a first rotatable joint to the knuckle assembly and to a chassis or subframe on the vehicle, wherein the first rotatable joint is rotatable in at least one plane at each end;
   a second link that connects a second rotatable joint to the knuckle assembly and to the chassis or subframe on the vehicle, wherein the second rotatable joint is rotatable in at least one plane at each end;
   a third link that connects a third rotatable joint to the knuckle assembly and to the chassis or subframe on the vehicle, wherein the third rotatable joint is rotatable in at least one plane at each end and does not lie in a plane defined by any points of the first or second link;
   a fourth link that connects a fourth rotatable joint to the knuckle assembly and to the chassis or subframe on the vehicle, wherein the fourth rotatable joint is rotatable in at least one plane at each end;
   wherein the first link, second link, third link, and fourth link are each independently moveable with respect to one another;
   a fifth link that connects a fifth rotatable joint to the knuckle assembly and to the chassis or subframe on the vehicle, wherein the fifth rotatable joint is rotatable in at least one plane at each end and used to steer the wheel or prevent steering of the wheel; and
   a spring and damper link that connects one of the first, second, third, and fourth links to another of the first, second, third, and fourth links, wherein the two links to which the spring and damper link connects are referred to as the two connected links, and wherein the spring and damper link connects to (i) a lower end of a spring damper system or (ii) a push-rod or a pull-rod of the spring damper system, and wherein the spring and damper link is free to rotate with respect to at least one of the two connected links.

2. The suspension system of claim 1, wherein the first link comprises a front, upper link, wherein the second link comprises a rear, upper link, wherein the third link comprises a front, lower link, and wherein the fourth link comprises a rear, lower link.

3. The suspension system of claim 1, wherein the spring and damper link is spherically y rotatable at both ends and is free to rotate with respect to at least one of the two connected links.

4. The suspension system of claim 3, wherein the spring and damper link is mounted to an upper or lower surface of each of the two connected links through articulating bearings.

5. The suspension system of claim 1, wherein the spring and damper link is configured to be out of a plane defined by the two connected links on at least one end, and wherein the spring and damper link is connected to one of the two connected links on a centerline axis of that link.

6. The suspension system for at least one corner of a vehicle having a chassis or multiple subframes, comprising:
- a knuckle assembly carrying at least a wheel and bearing assembly for contacting the ground at an edge of the vehicle;
- a first link that connects a first rotatable joint to the knuckle assembly and to a chassis or subframe on the vehicle, wherein the first rotatable joint is rotatable in at least one plane at each end;
- a second link that connects a second rotatable joint to the knuckle assembly and to the chassis or subframe on the vehicle, wherein the second rotatable joint is rotatable in at least one plane at each end;
- a third link that connects a third rotatable joint to the knuckle assembly and to the chassis or subframe on the vehicle, wherein the third rotatable joint is rotatable in at least one plane at each end and does not lie in a plane defined by any points of the first or second link;
- a fourth link that connects a fourth rotatable joint to the knuckle assembly and to the chassis or subframe on the vehicle, wherein the fourth rotatable joint is rotatable in at least one plane at each end;
- wherein the first link, second link, third link, and fourth link are each independently moveable with respect to one another;
- a fifth link that connects a fifth rotatable joint to the knuckle assembly and to the chassis or subframe on the vehicle, wherein the fifth rotatable joint is rotatable in at least one plane at each end and used to steer the wheel or prevent steering of the wheel; and
- a spring and damper link that connects one of the first, second, third, and fourth links to another of the first, second, third, and fourth links, wherein the two links to which the spring and damper link connects are referred to as the two connected links, and wherein the spring and damper link connects to (i) a lower end of a spring damper system or (ii) a push-rod or a pull-rod of the spring damper system, wherein the spring and damper link is mounted to a top or bottom surface of each of the two connected links such that the spring and damper link is out of a plane of the two connected links and is rotatably extensible relative to each of the two connected links.

7. A suspension system for at least one corner of a vehicle having a chassis or multiple subframes, comprising:
- a knuckle assembly carrying at least a wheel and bearing assembly for contacting the ground at an edge of the vehicle;
- a first link that connects a first rotatable joint to the knuckle assembly and to a chassis or subframe on the vehicle, wherein the first rotatable joint is rotatable in at least one plane at each end;
- a second link that connects a second rotatable joint to the knuckle assembly and to the chassis or subframe on the vehicle, wherein the second rotatable joint is rotatable in at least one plane at each end;
- a third link that connects a third rotatable joint to the knuckle assembly and to the chassis or subframe on the vehicle, wherein the third rotatable joint is rotatable in at least one plane at each end and does not lie in a plane defined by any points of the first or second link;
- a fourth link that connects a fourth rotatable joint to the knuckle assembly and to the chassis or subframe on the vehicle, wherein the fourth rotatable joint is rotatable in at least one plane at each end;
- a fifth link that connects a fifth rotatable joint to the knuckle assembly and to the chassis or subframe on the vehicle, wherein the fifth rotatable joint is rotatable in at least one plane at each end and used to steer the wheel or prevent steering of the wheel, and
- a spring and damper link that connects one of the first, second, third, and fourth links to another of the first, second, third, and fourth links, wherein the two links to which the spring and damper link connects are referred to as the two connected links, and wherein the spring and damper link connects to (i) a lower end of a spring damper system or (ii) a push-rod or a pull-rod of the spring damper system, wherein the spring and damper link is configured to vary in length based on a movement of the two connected links.

8. The suspension system of claim 7, wherein the spring and damper link is mounted on a centerline of each of the two connected links such that the spring and damper link is in a plane of the two connected links and is able to telescope during movement of the two connected links.

9. The suspension system of claim 7, wherein the spring and damper link lies within a plane established by the two connected links, and the spring and damper link comprises a telescoping link that can change its overall length by being linearly fixed and rotatable at one end and passing through a bearing system at the other end to accommodate length changes required by movement of the two connected links due to vertical travel or articulation of the wheel.

10. A suspension system for at least one corner of a vehicle having a chassis or multiple subframes, comprising:
- a knuckle assembly carrying at least a wheel and bearing assembly for contacting the ground at an edge of the vehicle;
- a first link that connects a first rotatable joint to the knuckle assembly and to a chassis or subframe on the vehicle, wherein the first rotatable joint is rotatable in at least one plane at each end;
- a second link that connects a second rotatable joint to the knuckle assembly and to the chassis or subframe on the vehicle, wherein the second rotatable joint is rotatable in at least one plane at each end;
- a third link that connects a third rotatable joint to the knuckle assembly and to the chassis or subframe on the vehicle, wherein the third rotatable joint is rotatable in at least one plane at each end and does not lie in a plane defined by any points of the first or second link;
- a fourth link that connects a fourth rotatable joint to the knuckle assembly and to the chassis or subframe on the vehicle, wherein the fourth rotatable joint is rotatable in at least one plane at each end and used to steer the wheel or prevent steering of the wheel; and
- a spring and damper link that connects one of the first, second and third links to one other of the first, second and third links, wherein the two links to which the spring and damper link connect are referred to as the two connected links, and which is used primarily to connect the lower end of a spring damper system, or wherein the spring and damper link connects to (i) a lower end of a spring damper system or (ii) a push-rod or a pull-rod of the spring damper system, wherein the spring and damper link is mounted outside of the plane defined by the two connected links, and is able to be rotatably extensible during movement of the two connected links.

11. The suspension system of claim 10, wherein the spring and damper link is configured to be out of a plane defined by the two connected links on at least one end, and wherein the spring and damper link is connected to one of the two connected links on a centerline axis of that link.

12. A suspension system for at least one corner of a vehicle having a chassis or multiple subframes, comprising:
a knuckle assembly carrying at least a wheel and bearing assembly for contacting the ground at an edge of the vehicle;
a first link that connects a first rotatable joint to the knuckle assembly and to a chassis or subframe on the vehicle, wherein the first rotatable joint is rotatable in at least one plane at each end;
a second link that connects a second rotatable joint to the knuckle assembly and to the chassis or subframe on the vehicle, wherein the second rotatable joint is rotatable in at least one plane at each end;
a third link that connects a third rotatable joint to the knuckle assembly and to the chassis or subframe on the vehicle, wherein the third rotatable joint is rotatable in at least one plane at each end and does not lie in a plane defined by any points of the first or second link;
a fourth link that connects a fourth rotatable joint to the knuckle assembly and to the chassis or subframe on the vehicle, wherein the fourth rotatable joint is rotatable in at least one plane at each end and used to steer the wheel or prevent steering of the wheel, and
a spring and damper link that connects one of the first, second and third links to one other of the first, second and third links, wherein the two links to which the spring and damper link connect are referred to as the two connected links, and which is used primarily to connect the lower end of a spring damper system, or wherein the spring and damper link connects to (i) a lower end of a spring damper system or (ii) a push-rod or a pull-rod of the spring damper system, wherein the spring and damper link is mounted on centerline of each of the two connected links such that the spring and damper link is in a plane of the two connected links and is able to telescope during movement of the two connected links.

13. A suspension system for a vehicle, comprising:
a first link rotatably connected to an upper portion of a wheel mount or knuckle at a first end and rotatably connected to a chassis of the vehicle at a second end;
a second link rotatably connected to the upper portion of the wheel mount at a first end and rotatably connected to the chassis of the vehicle at a second end;
a third link rotatably connected to a lower portion of the wheel mount at a first end and rotatably connected to the chassis of the vehicle at a second end;
a fourth link rotatably connected to the lower portion of the wheel mount at a first end and rotatably connected to the chassis of the vehicle at a second end;
wherein each of the first link, second link, third link, and fourth link is configured to move or pivot independently of the other links, wherein each of the first link, second link, third link, and fourth link is connected to the wheel mount at distinct points, and wherein each of the first link, second link, third link, and fourth link is rotatable at both ends in at least one plane; and
a spring and damper link coupled to two of the first, second, third and fourth links and that extends between one of the first, second, third and fourth links at a first end to a different one of the first, second, third and fourth links at a second end, wherein the first end of the spring and damper link is rotatably mounted to the two links of the first, second, third and fourth links, such that the spring and damper link can rotate at each of the first and second ends of the spring and damper link with respect to the two links of the first, second, third and fourth links.

14. The suspension system of claim 13, wherein the second link is situated rearward or behind the first link, and wherein the second link lies in the same horizontal (z) plane as the first link.

15. The suspension system of claim 14, wherein the fourth link is situated rearward or behind the third link, and wherein the fourth link lies in the same horizontal (z) plane as the third link.

16. The suspension system of claim 13, further comprising a fifth link that includes a tie rod or toe link, and wherein the fifth link connects to the wheel mount at a first end and a steering system of the vehicle at a second end.

17. The suspension system of claim 13, further comprising a spring damper system, in which (i) a lower end of the spring damper system is connected to the spring and damper link or (ii) a push-rod or a pull-rod of the spring damper system is connected at one end to the spring and damper link.

18. The suspension system of claim 13, wherein the spring and damper link is mounted to the two links of the first, second, third and fourth links such that the spring and damper link is non-orthogonal relative to each of the two links.

19. The suspension system of claim 13, wherein the wheel mount or knuckle carries at least a wheel and bearing assembly for contacting the ground with the wheel at a corner of the vehicle.

20. A suspension system for a vehicle, comprising:
a first link rotatably coupled to a portion of a wheel mount or knuckle at a first end and rotatably connected to a chassis of the vehicle at a second end;
a second link rotatably coupled to the portion of the wheel mount at a first end and rotatably connected to the chassis of the vehicle at a second end, wherein each of the first and second links are connected to the wheel mount at distinct points and wherein each of the first and second links are rotatable at both ends in at least one plane;
a spring and damper link rotatably coupled to the first link at a first end and the second link at a second end and that extends between the first and second links, such that the spring and damper link can rotate at the first end with respect to the first link and can rotate at the second end with respect to the second link; and
a spring damper system, in which (i) a lower end of the spring damper system is connected to the spring and damper link or (ii) a push-rod or a pull-rod of the spring damper system is connected at one end to the spring and damper link, wherein the spring and damper link is rotatably coupled to the first link at the first end and the second link at the second end, such that during vertical travel of the wheel mount, the first and second links will each move to permit movement of the spring and damper link and the shock assembly.

21. The suspension system of claim 20, further comprising:
- a third link rotatably connected to a different portion of the wheel mount at a first end and rotatably connected to the chassis of the vehicle at a second end; and
- a fourth link rotatably connected to the different portion of the wheel mount at a first end and rotatably connected to the chassis of the vehicle at a second end;
- wherein the fourth link is situated rearward or behind the third link, and wherein the fourth link lies in the same horizontal (z) plane as the third link.

22. The suspension system of claim 21, wherein each of the first, second, third and fourth links are configured to move or pivot independently of each other.

* * * * *